United States Patent
Onishi et al.

(10) Patent No.: US 12,312,243 B1
(45) Date of Patent: May 27, 2025

(54) CARBON NANOTUBES, CARBON NANOTUBE DISPERSION, CARBON NANOTUBE RESIN COMPOSITION, MIXTURE SLURRY, ELECTRODE FILM, SECONDARY BATTERY, METHOD FOR MANUFACTURING CARBON NANOTUBES, AND METHOD FOR MANUFACTURING A CARBON NANOTUBE DISPERSION

(71) Applicants: artience Co., Ltd., Tokyo (JP); TOYOCOLOR CO., LTD., Tokyo (JP)

(72) Inventors: Shumpei Onishi, Tokyo (JP); Naoki Deguchi, Tokyo (JP)

(73) Assignees: artience Co., Ltd., Tokyo (JP); TOYOCOLOR CO., LTD., Tokyo (JP)

(*) Notice: Subject to any disclaimer, the term of this patent is extended or adjusted under 35 U.S.C. 154(b) by 0 days.

(21) Appl. No.: 18/872,278

(22) PCT Filed: Jun. 17, 2024

(86) PCT No.: PCT/JP2024/021893
§ 371 (c)(1),
(2) Date: Dec. 6, 2024

(87) PCT Pub. No.: WO2025/004890
PCT Pub. Date: Jan. 2, 2025

(30) Foreign Application Priority Data

Jun. 28, 2023 (JP) ................... 2023-105931
May 31, 2024 (JP) ................... 2024-089114

(51) Int. Cl.
*C01B 32/174* (2017.01)
*C01B 32/168* (2017.01)
*H01M 4/62* (2006.01)

(52) U.S. Cl.
CPC .......... *C01B 32/174* (2017.08); *C01B 32/168* (2017.08); *C01P 2004/13* (2013.01); *C01P 2006/11* (2013.01); *H01M 4/622* (2013.01); *H01M 4/625* (2013.01)

(58) Field of Classification Search
CPC ... C01B 32/174; C01B 32/168; C01B 32/158; C01B 32/159; C01B 32/16; C01B 32/162; C01B 32/164; C01B 32/166; C01B 32/17; C01B 32/172; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C01P 2004/13; C01P 2006/11; H01M 4/622; H01M 4/625; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

U.S. PATENT DOCUMENTS

| | | |
|---|---|---|
| 2017/0036914 A1 | 2/2017 | Sohn et al. |
| 2018/0198129 A1 | 7/2018 | Kim et al. |
| 2019/0263663 A1 | 8/2019 | Yoon et al. |
| 2021/0005894 A1 | 1/2021 | Murase et al. |
| 2022/0173401 A1 | 6/2022 | Hirabayashi |
| 2022/0181636 A1 | 6/2022 | Hirabayashi |
| 2022/0315730 A1 | 10/2022 | Yamamoto |

FOREIGN PATENT DOCUMENTS

| | | |
|---|---|---|
| EP | 3786110 | 3/2021 |
| JP | 2011162698 | 8/2011 |
| JP | 2017201006 | 11/2017 |
| JP | 2018534747 | 11/2018 |
| JP | 2019192537 | 10/2019 |
| JP | 2020029372 | 2/2020 |
| JP | 2020029471 | 2/2020 |
| JP | 2021031514 | 3/2021 |
| JP | 2022042689 | 3/2022 |
| JP | 2022042691 | 3/2022 |
| KR | 1020130053015 | 5/2013 |

(Continued)

OTHER PUBLICATIONS

Zahedi, et al., Analytical study on the incorporation of zirconia-based ceramics with carbon nanotubes: Dispersion methods and mechanical properties, Ceramics International 2016; 42: 1653-1659 (Year: 2016).*

Munkhbayar, et al., Influence of dry and wet ball milling on dispersion characteristics of the multi-walled carbon nanotubes in aqueous solution with and without surfactant, Powder Technology 2013; 234: 132-140 (Year: 2013).*

Chintapalli, et al., Processing and characterization of high-density zirconia-carbon nanotube composites, Materials Science and Engineering A 2012; 549: 50-59 (Year: 2012).*

(Continued)

*Primary Examiner* — Daniel C. McCracken
(74) *Attorney, Agent, or Firm* — JCIPRNET

(57) ABSTRACT

Carbon nanotubes have a bulk density X of 0.095 g/cm³ or more and 0.125 g/cm³ or less, a Zr content of 5 ppm or more and 500 ppm or less, and a maximum solvent absorption capacity Y of carbon nanotubes defined by formula (5) below of 8.0 or more, $$Y = W/V \qquad \text{formula (5)}$$

(in formula (5), V is a mass (g) of carbon nanotubes, and W is a maximum mass (g) of N-methyl-2-pyrrolidone absorbed by carbon nanotubes when N-methyl-2-pyrrolidone is added dropwise to V (g) of carbon nanotubes in a 25° C. environment).

17 Claims, 1 Drawing Sheet

(56) References Cited

FOREIGN PATENT DOCUMENTS

| | | |
|---|---|---|
| KR | 102125933 | 6/2020 |
| WO | 2019181869 | 9/2019 |

OTHER PUBLICATIONS

Suarez, et al., Fabrication of Dense $ZrO_2$/CNT Composites: Influence of Bead-Milling Treatment, Metallurgical and Materials Transactions A; 2013; 44A: 4374-4381 (Year: 2013).*

"Notice of Reasons for Refusal of Japan Counterpart Application", issued on Feb. 20, 2024, with English translation thereof, p. 1-p. 12.

* cited by examiner

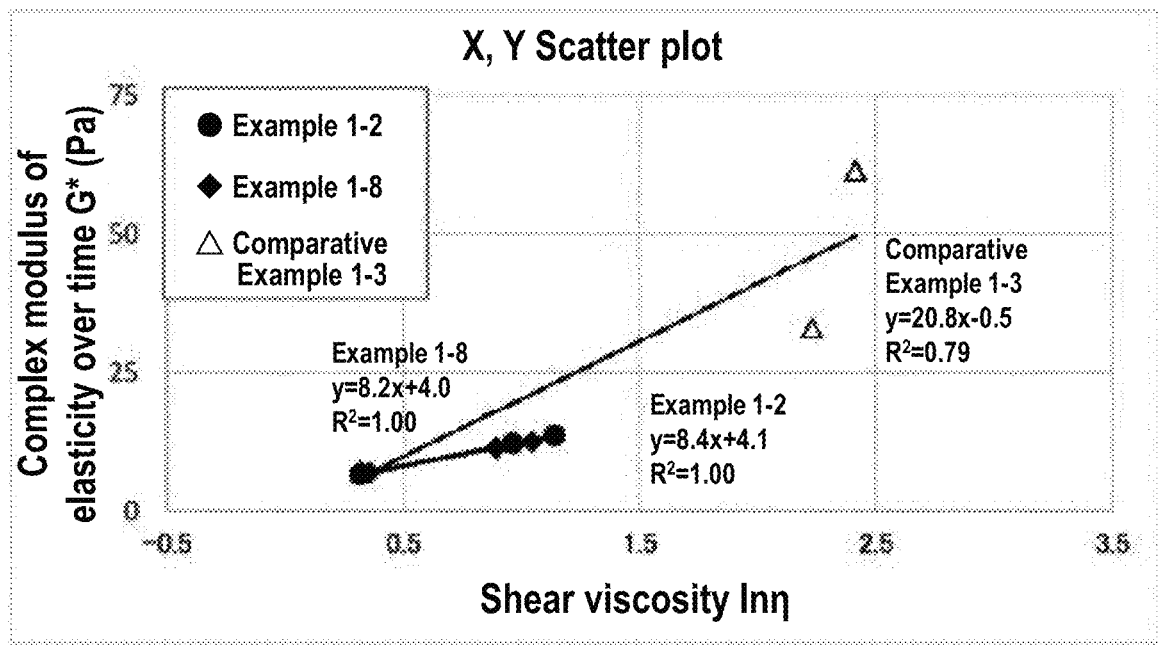

CARBON NANOTUBES, CARBON NANOTUBE DISPERSION, CARBON NANOTUBE RESIN COMPOSITION, MIXTURE SLURRY, ELECTRODE FILM, SECONDARY BATTERY, METHOD FOR MANUFACTURING CARBON NANOTUBES, AND METHOD FOR MANUFACTURING A CARBON NANOTUBE DISPERSION

CROSS-REFERENCE TO RELATED APPLICATION

This application is a 371 application of the International PCT application serial no. PCT/JP2024/021893, filed on Jun. 17, 2024, which claims the priority benefit of Japan Patent Application No. 2023-105931, filed on Jun. 28, 2023, and Japan Patent Application No. 2024-089114, filed on May 31, 2024. The entirety of each of the above-mentioned patent applications is hereby incorporated by reference herein and made a part of this specification.

TECHNICAL FIELD

The present invention relates to a carbon nanotube and a method for manufacturing carbon nanotube.

More specifically, the present invention relates to a carbon nanotube dispersion, a carbon nanotube resin composition including a carbon nanotube dispersion and a binder resin, a mixture slurry including a carbon nanotube dispersion, a binder resin, and an active material, an electrode film formed from the mixture slurry, and a secondary battery including the electrode film.

RELATED ART

Since carbon nanotubes have a structure in which graphite layers are formed into a cylindrical shape, are chemically stable, and possess conductivity and mechanical toughness, they are used in various applications such as electronic materials, structural materials, and paints. Specific applications of carbon nanotubes include electronic materials, semiconductor materials, filler materials, short needle probes for microscopes, adsorption materials, and filter materials. Among these applications, electrode materials using carbon nanotubes are expected to be applied to secondary batteries, fuel cells, electric double-layer capacitors, and other devices due to their excellent conductivity.

With the widespread adoption of electric vehicles and the miniaturization and performance enhancement of mobile phones, there is a growing demand for secondary batteries with high energy density, and further for increased capacity of these secondary batteries. Against this background, non-aqueous electrolyte secondary batteries, particularly lithium-ion secondary batteries, which use non-aqueous electrolytes, are being used in many devices due to their characteristics of high energy density and high voltage.

The electrodes of secondary batteries are manufactured by coating a current collector with a mixture slurry containing positive electrode active material or negative electrode active material, conductive material, binder resin, and other components. As conductive agents, carbon black, graphene, and fine carbon materials are used. However, to further improve conductivity and enhance battery capacity, the use of carbon nanotubes, a type of fine carbon fiber, is being considered. For example, by adding carbon nanotubes to the positive electrode, the conductivity of the electrode film may be improved, thereby reducing electrode resistance. Among these, multi-walled carbon nanotubes with outer diameters ranging from several nanometers to several tens of nanometers are relatively inexpensive and are being increasingly put into practical use. By using carbon nanotubes with a small average outer diameter and large fiber length, an efficient conductive network may be formed even with a small amount, enabling the increase in capacity of secondary batteries. On the other hand, carbon nanotubes with these characteristics have strong cohesive forces, making it more difficult to further enhance the dispersibility of carbon nanotube dispersions.

Patent Literature 1 proposes providing a high-concentration and low-viscosity carbon nanotube dispersion containing 2 mass % or more of carbon nanotubes by specifying the wettability index, which is the mass of absorbed solvent relative to the mass of carbon nanotubes. In Patent Literature 1, the wettability index is controlled by dry grinding carbon nanotubes using a milling device containing metal balls or ceramic balls. In specific examples, batch-type dry grinding is performed for 10 to 140 minutes using an attrition mill. Further, Patent Literature 2 proposes providing a carbon nanotube paint that imparts jet-black color and glossiness to resin molded bodies and automobile bodies, etc., by using carbon nanotubes with specified average outer diameter and surface oxygen concentration. In Patent Literature 2, the surface oxygen concentration of carbon nanotubes is controlled by grinding untreated carbon nanotubes using grinding media without the intervention of a liquid medium.

Patent Literature 3 discloses a conductive material dispersion including a dispersant containing a specific copolymer, a conductive material, and a dispersion medium. In Patent Literature 3, it is proposed to provide a conductive material dispersion in which high concentrations of carbon fibers are well dispersed in the dispersion medium by appropriately controlling the dispersion state so that the phase angle at a frequency of 1 Hz in dynamic viscoelastic measurement of the conductive material dispersion falls within a predetermined range. Further, Patent Literature 4 discloses a conductive material dispersion including a conductive material, a dispersant, and an amide-based organic solvent. In Patent Literature 4, it is proposed to provide a conductive material dispersion that may simultaneously achieve good dispersibility, stability, and handling properties by appropriately controlling the dispersion state so that the pH of the conductive material dispersion and the phase angle and complex modulus at a frequency of 1 Hz in dynamic viscoelastic measurement fall within predetermined ranges.

Related Art Literature(s)

PATENT LITERATURE

Patent Literature 1: Korean Patent No. 10-2125933.
Patent Literature 2: Japanese Patent Application Laid-Open (JP-A) No. 2020-029372.
Patent Literature 3: Japanese Patent Application Laid-Open (JP-A) No. 2022-042689.
Patent Literature 4: Japanese Patent Application Laid-Open (JP-A) No. 2022-042691.

SUMMARY

Technical Problem

In the case of dispersing carbon nanotubes in a dispersion medium, carbon nanotubes have a high aspect ratio and are strongly physically bonded to each other by van der Waals forces, resulting in difficulty in spreading in the dispersion medium due to the entanglement of carbon nanotubes with each other and the difficulty in disentangling bundles.

Further, dispersing carbon nanotubes in a dispersion medium increases the viscosity of the dispersion, making it difficult to obtain a dispersion containing uniformly dispersed high-concentration carbon nanotubes. In particular, it is extremely difficult to obtain a high-concentration dispersion that balances both fluidity and storage stability. To overcome the difficulty in dispersing carbon nanotubes due to their inherently high aspect ratio, technologies have been disclosed, such as those in Patent Literature 1 and Patent Literature 2, where carbon nanotubes are dry-treated using grinding media to improve the wettability of carbon nanotubes to solvents, thereby obtaining a low-viscosity carbon nanotube dispersion with a high concentration of 2 mass % or more of carbon nanotubes. However, in electrode films using carbon nanotubes, there is still room for improvement in sufficiently forming a developed conductive network derived from the inherently high aspect ratio of carbon nanotubes.

Patent Literature 3 and Patent Literature 4 disclose technologies for dispersing carbon nanotubes, which are conductive materials, at high concentrations by controlling the physical properties of the conductive material dispersion, such as phase angle and complex modulus, in addition to the composition of the conductive material dispersion (e.g., dispersant type) and pH. However, there is still room for improvement regarding the treatment method of carbon nanotubes themselves and the temporal stability of the conductive material dispersion.

In other words, the problem that the present invention aims to solve is to provide carbon nanotubes with high dispersibility and storage stability, and to provide a mixture slurry that has excellent fluidity and dispersion stability of the carbon nanotube dispersion, and good dispersibility when mixed with active materials. More specifically, it is to provide an electrode film with excellent adhesion to the current collector, and a high-power, high-capacity, long-life secondary battery and an electrode film used therein.

Solution to Problem

To achieve both fluidity and storage stability of a dispersion containing carbon nanotubes, it is important to reduce the high aspect ratio of carbon nanotubes and improve wettability of carbon nanotubes. On the other hand, to sufficiently form a developed conductive network in an electrode film using carbon nanotubes, it is important to disperse the carbon nanotubes while maintaining their inherently high aspect ratio to a certain extent or above, so there is a trade-off relationship between the fluidity/storage stability of the dispersion and the conductivity thereof. According to the present inventors' intensive studies aimed at solving the above problems, it was found that by setting the bulk density of carbon nanotubes and the Zr content contained in the carbon nanotubes to appropriate ranges, respectively, it is possible to maintain the wettability of CNTs to the dispersion medium while sufficiently forming a conductive network when forming a conductive film. Further, it was discovered that by finely controlling the grinding conditions to set both the bulk density of carbon nanotubes and the Zr content contained in the carbon nanotubes to appropriate ranges through dry treatment, it becomes possible to simultaneously achieve fluidity, storage stability, and conductivity of the resulting dispersion containing CNTs.

By using carbon nanotubes according to several embodiments of the present invention, it is possible to provide a carbon nanotube dispersion, a carbon nanotube resin composition, and a mixture slurry that achieve both fluidity and storage stability. Furthermore, by using these compositions with good dispersibility of carbon nanotubes, it is possible to obtain an electrode film having a developed conductive network, and to provide a high-power, high-capacity, and long-life secondary battery.

Further, due to the high dispersibility of carbon nanotubes according to several embodiments of the present invention, it is possible to maintain fluidity and storage stability even in the case of a dispersion containing a high concentration of carbon nanotubes. As a result, it is possible to include carbon nanotubes in high concentration and uniformly in the electrode film and secondary battery, thereby providing a secondary battery with even higher power and capacity.

That is, the present invention includes the following embodiments. The embodiment of the present invention is not limited to the following.

[1] Carbon nanotubes having a bulk density X of 0.095 g/cm$^3$ or more and 0.125 g/cm$^3$ or less, a Zr content of 5 ppm or more and 500 ppm or less, and a maximum solvent absorption capacity Y of carbon nanotubes defined by formula (5) below of 8.0 or more, $$Y=W/V \quad \text{formula (5)}$$

(in formula (5), V is a mass (g) of carbon nanotubes, and W is a maximum mass (g) of N-methyl-2-pyrrolidone absorbed by carbon nanotubes when N-methyl-2-pyrrolidone is added dropwise to V (g) of carbon nanotubes in a 25° C. environment).

[2] The carbon nanotubes according to [1], wherein a bulk density X (g/cm$^3$) and a maximum solvent absorption capacity Y of carbon nanotubes satisfy all of formulae (1) to (4) below, $$Y \leq -200X+37 \quad \text{formula (1)}$$

$$Y \geq 200X-17 \quad \text{formula (2)}$$

$$Y \geq -200X+27 \quad \text{formula (3)}$$

$$Y \leq 200X+7 \quad \text{formula (4)}.$$

[3] The carbon nanotubes according to [1] or [2], wherein an average fiber length is 0.2 μm or more and 1.1 μm or less.

[4] The carbon nanotubes according to [1] or [2], wherein an average fiber length is 0.2 μm or more and 1.0 μm or less, and a Zr content is 15 ppm or more and 200 ppm or less.

[5] A carbon nanotube dispersion, containing carbon nanotubes according to any one of [1] to [4], a dispersant, and a non-aqueous dispersion medium.

[6] The carbon nanotube dispersion according to [5], wherein a determination coefficient $R^2$ of a regression line represented by formula (I) below is 0.85 or more, a slope a is $2 \leq a < 20$, and a y-intercept b is $-5 \leq b < 10$, $$y=ax+b \quad \text{formula (I)}$$

(formula (I) is a regression line obtained by a least-squares method from a scatter plot with x plotted on a horizontal axis and y plotted on a vertical axis, measured using carbon nanotube dispersions with storage temperatures and durations of 40° C. for 1 day, 40° C. for 7 days, and 40° C. for 14 days, respectively, when i is a number of days elapsed during storage, $\eta_i$(Pa·s) is a shear viscosity at 25° C. and a shear rate of 1.0 s$^{-1}$ of a resin composition for secondary battery when a storage temperature is 40° C., and $G^*_i$ (Pa) is a complex modulus at 25° C. and a frequency of 1 Hz obtained by dynamic viscoelastic measurement, x is a natural logarithm (ln(i)) of the shear viscosity $\eta_i$(Pa·s) at 25° C. and a shear rate of 1.0 s$^{-1}$, y is the complex modulus G*$_i$ (Pa) at 25° C. and a frequency of 1 Hz, and i is 1, 7, and 14, with a manufacturing date of carbon nanotube dispersion being day 0).

[7] A carbon nanotube resin composition, containing a carbon nanotube dispersion according to [5] or [6] and a binder resin.

[8] A mixture slurry, containing a carbon nanotube dispersion according to any one of [5] to [7], a binder resin, and an active material.

[9] An electrode film, being formed from a mixture slurry according to [8].

[10] A secondary battery, containing a positive electrode and a negative electrode, wherein at least one of the positive electrode and the negative electrode contains an electrode film according to [9].

[11] A method for manufacturing carbon nanotubes, comprising a process of dry grinding carbon nanotubes using a milling device including grinding media made of metal or ceramics, wherein the dry grinding is pass-type grinding or circulation-type grinding, and carbon nanotubes after the dry grinding have a bulk density X of 0.095 g/cm$^3$ or more and 0.125 g/cm$^3$ or less, a Zr content of 5 ppm or more and 500 ppm or less, and a maximum solvent absorption capacity Y of carbon nanotubes defined by formula (5) below of 8.0 or more, $$Y=W/V \qquad \text{formula (5)}$$

(in formula (5), V is a mass (g) of carbon nanotubes, and W is a maximum mass (g) of N-methyl-2-pyrrolidone absorbed by carbon nanotubes when N-methyl-2-pyrrolidone is added dropwise to V (g) of carbon nanotubes in a 25° C. environment).

[12] The method for manufacturing carbon nanotubes according to [11], wherein a change rate between a bulk density X after dry grinding and a bulk density X' before dry grinding is −60% or more and 1000% or less, bulk density change rate (%)=(X/X'-1)×100.

[13] The method for manufacturing carbon nanotubes according to [11] or [12], wherein a change rate between a powder resistance value Re after dry grinding and a powder resistance value Re' before dry grinding is 1% or more and 20% or less, powder resistance value change rate (%)=(Re/Re'-1)×100.

[14] The method for manufacturing carbon nanotubes according to any one of [11] to [13], wherein the grinding media are zirconia beads, and a bead diameter of the zirconia beads is more than 5 mm and less than 10 mm.

[15] The method for manufacturing carbon nanotubes according to any one of [11] to [14], wherein carbon nanotubes after the dry grinding have an average fiber length of 0.2 μm or more and 1.1 μm or less.

[16] The method for manufacturing carbon nanotubes according to any one of [11] to [15], wherein carbon nanotubes after the dry grinding have an average fiber length of 0.2 μm or more and 1.0 μm or less, and a Zr content of 15 ppm or more and 200 ppm or less.

[17] A method for manufacturing a carbon nanotube dispersion, comprising a process of mixing and dispersing carbon nanotubes according to any one of [11] to [16], a dispersant, and a non-aqueous dispersion medium.

Effects of Invention

According to an embodiment of the present invention, it is possible to provide carbon nanotubes that exhibit excellent dispersibility, and by using these carbon nanotubes, it is possible to provide a carbon nanotube dispersion with excellent fluidity and high dispersion stability and storage stability. Further, according to another embodiment of the present invention, it is possible to provide a carbon nanotube resin composition that exhibits excellent fluidity and storage stability even when mixed with a binder resin, and because of the excellent dispersibility of the carbon nanotubes even after mixing with an active material, it is possible to provide a mixture slurry for secondary battery electrodes that is less likely to form carbon nanotube agglomerates or precipitates, and may exhibit high conductivity during electrode film formation. According to yet another embodiment of the present invention, it is possible to provide a secondary battery with high output, high capacity, and long life.

BRIEF DESCRIPTION OF DRAWINGS

FIG. is an example of a scatter plot and a regression line expressed by a least-squares method from the scatter plot, showing the natural logarithm (ln(η)) of the shear viscosity η (Pa·s) and the complex modulus G*(Pa) measured using carbon nanotube dispersions of examples or comparative examples.

DESCRIPTION OF EMBODIMENTS

The following provides a detailed description of embodiments of the present invention, including a carbon nanotube, a carbon nanotube dispersion, a carbon nanotube resin composition containing a carbon nanotube dispersion and a binder resin, a mixture slurry containing a carbon nanotube dispersion, a binder resin, and an active material, an electrode film formed from a mixture slurry, a secondary battery including such electrode film, and a method for manufacturing carbon nanotube. The present invention is not limited to the following embodiments, and the present invention also includes embodiments implemented in a range that does not change the gist of the present invention.

It should be noted that the carbon nanotube dispersion and the carbon nanotube resin composition containing the carbon nanotube dispersion and binder resin refer to the state before the addition of active material. In this regard, the carbon nanotube dispersion and carbon nanotube resin composition are distinguished from the mixture slurry containing the active material. That is, the carbon nanotube dispersion and carbon nanotube resin composition do not substantially contain active material. This concept excludes the state where active material is intentionally added to the carbon nanotube dispersion and carbon nanotube resin composition, and the active material may be 1 mass % or less, 0.5 mass % or less, or 0.1 mass % or less, or may be 0 mass %, with respect to the total mass of the carbon nanotube dispersion and carbon nanotube resin composition.

In this specification, carbon nanotubes may be referred to as "CNT" and N-methyl-2-pyrrolidone may be referred to as "NMP". Furthermore, in this specification, carbon nanotube dispersion may be referred to as "CNT dispersion" or simply "dispersion".

Carbon Nanotube

The carbon nanotube of the present embodiment satisfy a bulk density X of 0.045 g/cm$^3$ or more and 0.125 g/cm$^3$ or less, and have a Zr content of 3 ppm or more and 500 ppm or less. As a result, this carbon nanotube has excellent dispersibility, and the carbon nanotube dispersion using this carbon nanotube may achieve both fluidity and storage stability.

More preferably, the carbon nanotube satisfies a bulk density X of 0.095 g/cm$^3$ or more and 0.125 g/cm$^3$ or less, has a Zr content of 5 ppm or more and 500 ppm or less, and has a maximum solvent absorption capacity Y of the carbon nanotube, as defined by formula (5) described later, of 8.0 or more. As a result, the carbon nanotube dispersion manufactured using this carbon nanotube may further enhance filterability and acid stability.

From another viewpoint, it is preferable that the carbon nanotube satisfies a bulk density X of 0.045 g/cm$^3$ or more and 0.125 g/cm$^3$ or less, has a Zr content of 3 ppm or more and 500 ppm or less, and has a maximum solvent absorption capacity Y of the carbon nanotube, as defined by formula (5) described later, of 14.0 or more. As a result, the CNT dispersion may possess dispersibility, and the battery performance may be further improved by the conductive network in the secondary battery. In this case, it is preferable that the average fiber length of the CNT is 1.0 μm or more, 1.5 μm or more, or 1.9 μm or more, and it is preferable that it is 10 μm or less, 5 μm or less, or 2.0 μm or less. Within these ranges, the conductivity and adhesion may be further improved by the conductive network in the secondary battery.

Regarding the filterability of CNT dispersion, it tends to decrease due to slight agglomerates derived from CNT and other resin components in the CNT dispersion. Thus, as the filterability improves, the degree of CNT disentanglement may also improve. As a result, in the secondary battery, the conductive network may be further developed. Further, as the filterability improves, the effect of reducing filter clogging and other issues in the manufacturing processes of CNT dispersion, CNT resin composition, and mixture slurry may also be obtained. Further, regarding the acid stability of CNT dispersion, in the case where the stability of the CNT dispersion remains good even when acid is added, it tends to maintain good viscosity over time. In CNT dispersion, it is considered that one of the factors is that acid acts on CNTs to which dispersants are not adsorbed, causing agglomeration. Thus, as the acid stability improves, the stability of the CNT dispersion over time may also improve. As a result, in the secondary battery, the conductive network may be further developed.

The bulk density X of CNT contributes to the wettability of liquid medium, and in the case of treating CNT by dry grinding or other methods, it may be used as one of the indicators of the degree of CNT treatment.

Among them, when using CNT as a conductive material for battery applications, one of the most important factors is to take advantage of the high aspect ratio unique to CNT in the CNT dispersion. In the case of improving the wettability of CNT to liquid medium by dry treatment or other methods, if the treatment intensity is too strong, it may promote the formation of CNT agglomerates, resulting in insufficient dissolution of CNT in non-aqueous solvents, and also may decrease conductivity as a result of reduced aspect ratio. Further, although it is possible to disperse the CNT agglomerates at high intensity without performing CNT treatment such as dry grinding, due to the breakage of CNT fibers and other factors, the obtained dispersion may be at risk of poor storage stability.

By having the bulk density X of CNT be 0.045 g/cm$^3$ or more and 0.125 g/cm$^3$ or less, it is possible to appropriately control the strength of CNT agglomeration and the size of agglomerates. As a result, since it is possible to moderately disperse CNT fibers in non-aqueous solvents without breaking the same, and maintain the required conductivity, by forming an electrode film using this dispersion, it is possible to form a developed conductive network in the electrode film.

The bulk density X of CNT is 0.045 g/cm$^3$ or more, preferably 0.050 g/cm$^3$ or more, and more preferably 0.080 g/cm$^3$ or more. In addition, it is 0.125 g/cm$^3$ or less, preferably 0.120 g/cm$^3$ or less, more preferably 0.110 g/cm$^3$ or less, and even more preferably 0.100 g/cm$^3$ or less.

The bulk density X of CNT is more preferably 0.090 g/cm$^3$ or more, even more preferably 0.095 g/cm$^3$ or more, and may be 0.097 g/cm$^3$ or more, 0.099 g/cm$^3$ or more, or 0.100 g/cm$^3$ or more from the viewpoint of appropriately controlling the strength of CNT agglomeration and the size of agglomerates to further improve filterability. For example, the bulk density X of CNT is more preferably 0.090 g/cm$^3$ or more and 0.125 g/cm$^3$ or less, and even more preferably 0.095 g/cm$^3$ or more and 0.120 g/cm$^3$ or less. In these ranges, the filterability and acid stability in the CNT dispersion may be further enhanced.

The bulk density X of CNT in the present disclosure refers to the loose bulk density during loose filling. The bulk density X may be determined by allowing CNT to fall freely into a container with an open top of a predetermined volume until it overflows, leveling off the raised CNT powder at the top surface with a leveling plate in a stationary state, measuring the mass of CNT, and dividing the mass of CNT by the volume of the container.

As a specific method for measuring the bulk density X, for example, CNT powder may be allowed to fall freely into a 30 ml stainless steel cylindrical container, and after leveling off the raised portion at the top surface of the container, the mass of the CNT powder may be determined and divided by the volume of the container. In order to break up agglomerates formed during storage of the CNT powder and allow the obtained sample to flow freely into the measuring container until it overflows, a sufficient amount of sample for testing is prepared by passing it through a 0.5 mm sieve.

The Zr content included in the CNT of the present embodiment is 3 ppm or more and 500 ppm or less.

It is preferably 400 ppm or less, more preferably 300 ppm or less, and even more preferably 200 ppm or less. Further, it is preferably 4 ppm or more, and more preferably 5 ppm or more. The Zr content included in the CNT is more preferably 5 ppm or more, even more preferably 10 ppm or more, still more preferably 15 ppm or more, and may be 20 ppm or more, 30 ppm or more, or 40 ppm or more from the viewpoint of weakening the van der Waals forces between CNTs and further improving the dispersion stability of CNTs. For example, the Zr content included in the CNT is preferably 5 ppm or more and 500 ppm or less, more preferably 10 ppm or more and 300 ppm or less, and even more preferably 15 ppm or more and 200 ppm or less. In these ranges, the dispersion stability in the CNT dispersion may be further enhanced, and the battery performance may be further improved.

The Zr content of CNT may be measured by inductively coupled plasma (ICP) emission spectroscopy.

Further, the Zr included in CNT, which is detected as the element zirconium by ICP emission spectroscopy, may be a substance used in the pretreatment process such as dry treatment of CNT (for example, grinding media), or may be from wear of dispersion device components, or may be introduced by adding compounds such as zirconia (zirconium oxide) containing zirconium to CNT. The Zr content of CNT may be adjusted by modifying the type of dry grinding media, additives/coating agents, or dry grinding treatment conditions (time, intensity, treatment temperature, etc.). Further, the Zr contained in CNT may be partially reduced by centrifugal separation, etc., utilizing the difference in specific gravity between CNT and Zr.

It should be noted that Zr excels in toughness and heat resistance, and since most zirconia exists in a size that is unable to be classified with CNT, it is difficult to completely remove all of it once it is mixed in at any manufacturing process from CNT pretreatment to CNT dispersion, CNT resin composition containing the same, mixture slurry, and finally to secondary battery. Thus, it is particularly important in secondary battery applications to appropriately control the Zr content of CNT by the method described above.

The carbon nanotubes according to some embodiments of the present invention possess excellent effects by being a carbon nanotube composition that includes Zr.

The reason why the dispersibility of CNT becomes favorable by setting both the bulk density X and the Zr amount within the specified ranges is not clear, but it is presumed as follows. It is presumed that the presence of Zr weakens the van der Waals forces between CNTs and enhances the dispersion stability of CNTs. With a Zr content of 3 ppm or more, it is not necessary to apply strong force to uniformly disperse CNTs that form bundle structures due to van der Waals forces, thereby suppressing the increase in powder resistivity of CNTs and volume resistivity of electrodes containing CNTs. Further, with a Zr content of 500 ppm or less, the adsorption of dispersants to CNTs is not inhibited by excessive Zr, preventing unstable dispersion states, and the decrease in discharge capacity due to Zr adhering to active materials may also be suppressed. More preferably, the Zr content is 5 ppm or more and 500 ppm or less.

On the other hand, as mentioned above, the bulk density contributes to the wettability of liquid medium to carbon nanotubes, and by appropriately controlling the bulk density, CNTs may be uniformly and favorably dispersed while maintaining the length of CNTs at a certain level or above, thereby forming a well-developed conductive network.

By setting both the bulk density and Zr amount within the specified ranges, it becomes possible to maximize the inherent conductivity of CNTs while achieving both dispersibility and temporal stability of CNTs.

The CNT of the present embodiment, from the viewpoint of more finely controlling the state of CNT defibration and microscopically controlling the dispersibility in CNT dispersion, preferably satisfies all of the following formulas (1) to (4), where $X$ (g/cm$^3$) is the bulk density and $Y$ is the maximum solvent absorption capacity of the carbon nanotube defined by the following formula (5).

$Y \leq -200X+37$      formula (1)

$Y \geq 200X-17$      formula (2)

$Y \geq -200X+27$      formula (3)

$Y \leq 200X+7$      formula (4)

$Y = W/V$      formula (5)

(in formula (5), V is a mass (g) of carbon nanotubes, and W is a maximum mass (g) of N-methyl-2-pyrrolidone absorbed by carbon nanotubes when N-methyl-2-pyrrolidone is added dropwise to V (g) of carbon nanotubes in a 25° C. environment).

The maximum solvent absorption capacity Y of CNT is defined by the above formula (5). The maximum solvent absorption capacity Y is the maximum mass of N-methyl-2-pyrrolidone absorbed by CNT per mass of CNT when CNT absorbs N-methyl-2-pyrrolidone. The maximum mass of N-methyl-2-pyrrolidone absorbed by CNT is the total mass of N-methyl-2-pyrrolidone dropped until just before N-methyl-2-pyrrolidone flows out from the CNT powder when N-methyl-2-pyrrolidone is dropped onto the CNT powder.

Specifically, in a 25° C. environment, 5 g (V(g)) of CNT powder is placed by natural fall into a cylindrical polypropylene container with a diameter of 10 mm and left to settle. In this state, N-methyl-2-pyrrolidone is dropped onto the surface of the CNT powder in 0.5 g increments at 1-minute intervals. It is observed whether or not the droplets of N-methyl-2-pyrrolidone begin to flow out on the surface of the CNT powder without being absorbed by the CNT powder. The total mass (g) of N-methyl-2-pyrrolidone dropped until just before the droplets of N-methyl-2-pyrrolidone begin to flow out on the surface of the CNT powder is designated as W(g).

The following describes formulas (1) to (4). By having the maximum solvent absorption capacity Y and the bulk density X, obtained as described above, within the range specified by the aforementioned formulas (1) to (4), the dispersibility and storage stability of CNT may be further enhanced.

The maximum solvent absorption capacity Y is the maximum mass of N-methyl-2-pyrrolidone absorbed by CNT, but it is not limited to the type of dispersion medium, the smaller the maximum solvent absorption capacity, the more it tends to suppress the initial viscosity increase of CNT in the dispersion medium and contribute to improved dispersibility. On the other hand, the bulk density X is a factor that affects the dispersibility and storage stability of CNT in the dispersion medium. Although it is unable to be generalized, as the bulk density increases, CNT tends to settle more easily in the dispersion medium, and as the bulk density decreases, the wettability of CNT in the dispersion medium decreases, making it more likely for dispersibility to decrease.

Focusing on the fact that the maximum solvent absorption capacity Y and the bulk density X interact with each other to affect the dispersibility and storage stability of carbon nanotubes in the dispersion medium, carbon nanotubes may be specified by the above formulas (1) to (4). In improving the dispersibility and storage stability of carbon nanotubes, it is more preferable to defibrate the carbon nanotubes while maintaining a high aspect ratio and to have them finely dispersed in the dispersion medium.

In the case where the maximum solvent absorption capacity Y and the bulk density X do not satisfy formula (1), that is, when $Y > -200X+37$, there is a risk that the powder resistivity and electrode resistivity of CNT may increase, leading to a decrease in battery performance. Preferably, $Y \leq -200X+35$, and more preferably, $Y \leq -200X+33$.

In the case where the maximum solvent absorption capacity Y and the bulk density X do not satisfy formula (2), that is, when $Y < 200X-17$, there is a risk that CNT may agglomerate or settle, leading to an increase in electrode resistivity and a decrease in battery performance. Preferably, $Y \geq 200X-13$, and more preferably, $Y \geq 200X-9$.

In the case where the maximum solvent absorption capacity Y and the bulk density X do not satisfy formula (3), that is, when $Y \leq -200X+27$, there is a risk that the dispersibility of CNT may be poor, leading to agglomeration or settling, and a decrease in battery performance. Preferably, $Y \geq -200X+29$, and more preferably, $Y \geq -200X+31$.

In the case where the maximum solvent absorption capacity Y and the bulk density X do not satisfy formula (4), that is, when $Y > 200X+7$, there is a risk that the dispersibility of CNT may be poor, leading to a decrease in the fluidity and storage stability of the CNT dispersion, and a decrease in battery performance. Preferably, Y≤200X+3, and more preferably, Y≤200X−1.

The numerical range of the maximum solvent absorption capacity Y is not particularly limited. For example, the maximum solvent absorption capacity may be 5 to 22, 5 to 18, or 14 to 18. In other examples, the maximum solvent absorption capacity may be 5 to 12, or 14 to 22. From the viewpoint of further improving filterability and acid stability in the CNT dispersion, the maximum solvent absorption capacity Y is preferably 8.0 or more. More preferably, it is 8.4 or more, even more preferably 8.5 or more, and most preferably 11.8 or more. For example, the maximum solvent absorption capacity Y may be 8.4 or more and 22 or less, 8.5 or more and 18 or less, or 11.8 or more and 12.7 or less.

From another viewpoint, the maximum solvent absorption capacity Y is preferably 14 or more. For example, it may be 14 or more and 22 or less, 16 or more and 18 or less, or 17.1 or more and 17.5 or less. In these ranges, the dispersion stability in the CNT dispersion may be further enhanced, and the battery performance may be further improved.

The CNT may include single-walled CNT, multi-walled CNT, and these may coexist. Single-walled CNT possess a structure where a single layer of graphite is rolled, while multi-walled CNT possess a structure where two or more layers of graphite are rolled. Further, the sidewalls of the CNT do not necessarily need to have a graphite structure.

For example, CNT with sidewalls having an amorphous structure are also considered CNT in this specification. The CNT may be manufactured by any method. CNT can generally be produced by laser ablation method, arc discharge method, thermal CVD method, plasma CVD method, and combustion method, but are not limited thereto. Further, the CNT may be surface-treated CNT. The CNT may be CNT derivatives with functional groups such as carboxyl groups. Further, CNT encapsulating organic compounds, metal atoms, or substances represented by fullerenes may also be used.

The average outer diameter of the CNT is preferably 1 nm or more, more preferably 3 nm or more, and even more preferably 5 nm or more. Further, it is preferably 30 nm or less, more preferably 20 nm or less, and even more preferably 15 nm or less. It is noted that the average outer diameter of the CNT may be calculated by first observing and imaging the CNT using a transmission electron microscope, then selecting 300 arbitrary CNT in the observed image, and measuring the outer diameter of each.

The average fiber length of the CNT is preferably 0.1 μm or more, more preferably 0.2 μm or more, and even more preferably 0.5 μm or more. Further, it is preferably 5.0 μm or less, more preferably 2.0 μm or less, and even more preferably 1.0 μm or less. It is noted that the average fiber length of the CNT may be calculated by first observing and imaging the CNT using a scanning electron microscope, then selecting 300 arbitrary CNT in the observed image, and measuring the fiber length of each.

From the viewpoint of further improving battery performance through the conductive network of the secondary battery, the average fiber length of the CNT is more preferably 0.2 μm or more, even more preferably 0.5 μm or more, and still more preferably 0.8 μm or more. From the viewpoint of further improving filterability and acid stability in the CNT dispersion, the average fiber length of the CNT is more preferably 1.5 μm or less, even more preferably 1.1 μm or less, and still more preferably 1.0 μm or less. For example, it may be 0.2 μm or more and 1.5 μm or less, 0.5 μm or more and 1.1 μm or less, or 0.8 μm or more and 1.0 μm or less, and it is more preferably 0.2 μm or more and 1.1 μm or less, and even more preferably 0.2 μm or more and 1.0 μm or less.

The aspect ratio is the value obtained by dividing the fiber length of the CNT by its outer diameter. A representative aspect ratio may be calculated using the values of average fiber length and average outer diameter. The higher the aspect ratio of the conductive material, the higher the conductivity that may be obtained when forming an electrode. The aspect ratio of the CNT is preferably 30 or more, more preferably 50 or more, and even more preferably 80 or more. Further, it is preferably 10,000 or less, more preferably 3,000 or less, and even more preferably 1,000 or less.

The specific surface area of the CNT is preferably 100 $m^2/g$ or more, more preferably 150 $m^2/g$ or more, and even more preferably 200 $m^2/g$ or more. Further, it is preferably 1200 $m^2/g$ or less, more preferably 1000 $m^2/g$ or less, and even more preferably 800 $m^2/g$ or less. The specific surface area of the CNT is calculated by the BET method using nitrogen adsorption measurement. When the average outer diameter, average fiber length, aspect ratio, and specific surface area are within the above range, it becomes easier to form a developed conductive path in the electrode.

The carbon purity of the CNT is expressed as the content (mass %) of carbon atoms in the CNT. The carbon purity is preferably 80 mass % or more, more preferably 90 mass % or more, even more preferably 95 mass % or more, and particularly preferably 98 mass % or more, with respect to 100 mass % of CNT. By setting the carbon purity within the above range, it is possible to prevent problems such as the formation of dendrites and short circuits caused by impurities such as metal catalysts.

CNTs that have undergone high-purity treatment may be used for the purpose of removing or reducing impurities such as metal catalysts and increasing carbon purity. The method of high-purity treatment is not particularly limited, and known methods may be used.

According to several embodiments, the CNT preferably satisfies a bulk density X of 0.095 $g/cm^3$ or more and 0.125 $g/cm^3$ or less, has a Zr content of 5 ppm or more and 500 ppm or less, and has a maximum solvent absorption capacity Y of the carbon nanotubes defined by the formula (5) described later of 8.0 or more, and satisfies (1) or (2) below. As a result, the carbon nanotube dispersion manufactured using this carbon nanotube may further enhance filterability and acid stability.

(1) The average fiber length is 0.2 μm or more and 1.1 μm or less.
(2) The average fiber length is 0.2 μm or more and 1.0 μm or less, and the Zr content is 15 ppm or more and 200 ppm or less.

Manufacturing Method of Carbon Nanotube

The manufacturing method of the CNT of the present embodiment is not limited and may be specified by its physical properties. It can be prepared by manufacturing CNT according to conventional manufacturing methods or by pre-treating conventionally known CNT. The pre-treatment method for CNT is not particularly limited and may include surface treatment using reagents, heat treatment, etc. One or more pre-treatment methods may be adopted in combination, but it is preferable to include at least a grinding treatment. By optimizing the grinding treatment conditions, the physical properties of the carbon nanotubes may be controlled.

For example, the CNT of the present embodiment may be obtained by grinding CNT with easily obtainable physical properties. The grinding treatment may be either wet grinding or dry grinding, and grinding media may be used. From the viewpoint of ease of controlling the physical properties of CNT, dry grinding is preferable, and dry grinding using grinding media is even more preferable. The grinding media may be metal or ceramic material grinding media, and is not particularly limited. The components added to the grinding device may be untreated CNT alone, but optional components such as lubricants, dispersants, and surface treatment agents may be further added. Although dry grinding is preferable, a liquid medium may be added to the grinding device together with untreated CNT as needed.

In the case of using a grinding device, the grinding treatment may be batch-type, pass-type, or circulation-type treating method. From the viewpoint of ease of controlling the physical properties of CNT, pass-type or circulation-type is preferable, and circulation-type is more preferable. Batch-type refers to a method of treating using only the main body of the dispersion device without using piping, etc. Pass-type refers to a method in which the main body of the grinding device is provided with a tank for supplying CNT and a tank for receiving CNT via piping, and the CNT is passed through the main body of the grinding device. Further, circulation-type refers to a method in which CNT that has passed through the main body of the dispersion device is returned to the tank supplying CNT and treated while circulating. In all cases, the longer the processing time, the more the grinding treatment progresses, so it is sufficient to repeat the pass or circulation until the desired state is reached, and the processing amount may be increased by changing the tank size or processing time. Specific grinding devices include, for example, bead mills, ball mills, attrition mills, etc., but ball mills and attrition mills correspond to batch-type processing. As a pass-type or circulation-type grinding device, for example, a dry continuous grinding device provided with a high-speed rotating arm in a horizontally cylindrical tank and stirring grinding media may be used. In the case of using zirconia beads as grinding media, it is preferable to use a pass-type or circulation-type dry continuous grinding device from the viewpoint of adjusting the Zr content of CNT to an appropriate range.

In pass-type or circulation-type grinding treatment, desired CNT may be obtained by controlling the input mass per unit time of CNT fed into the grinding device, the type, diameter, and input amount of grinding media, grinding treatment temperature, etc. In one example, it is preferable to input CNT raw material into a circulation-type bead mill and perform dry grinding. As a method for controlling the grinding treatment temperature, there are methods of cooling using a cooling jacket provided on the main body of the grinding chamber, cooling outside the bead mill system, and using both of these methods in combination. From the viewpoint of cooling efficiency, the method of cooling using a cooling jacket provided on the main body of the grinding chamber is preferable. Further, the grinding treatment temperature can be measured by installing a thermometer in any piping, and specifically, it may be confirmed by the powder outlet temperature by installing a thermometer at the outlet of the bead mill.

In the case of performing dry grinding using grinding media, the grinding media may be made of ceramic materials to prevent contamination of metal impurities such as iron in the CNT and also from the viewpoint of grinding treatment intensity, with zirconia being more preferable. The grinding media diameter is preferably 1 mm or more, more preferably 3 mm or more, and even more preferably 5 mm or more. By having the grinding media diameter in the above range or larger, the collision energy with the CNT increases, and the dry grinding efficiency may be enhanced. Further, the grinding media diameter is preferably 15 mm or less, more preferably 10 mm or less, and even more preferably 8 mm or less. By having the grinding media diameter in the above range or smaller, wear due to collisions between grinding media may be reduced. Further, grinding media used for dry grinding of CNT may cause poor dispersion treatment and contamination due to wear or breakage through repeated use. Thus, it is preferable to classify and clean the grinding media before use. In the case of using zirconia beads as grinding media, from the viewpoint of more appropriately adjusting the Zr content in the CNT, the bead diameter should be more than 5 mm and less than 10 mm When using two or more types of beads with significantly different bead diameters, the beads wear due to collisions between beads, making it easier for a large amount of Zr to be mixed into the CNT, so it is preferable to keep the bead diameter within ±1 mm. This tendency becomes stronger in the bead mill for dry grinding, so in the case of using a bead mill, it is preferable to use one type of zirconia beads, and it is more preferable to set the bead diameter of the zirconia beads to ±1 mm.

Here, the necessity and effects of CNT pretreatment, especially dry treatment, are described in detail.

In the case of preparing a CNT dispersion while maintaining the length of CNTs, that is, maintaining a high aspect ratio, the poor wettability of CNTs in the dispersion medium due to their bulkiness may result in poor handling, potentially leading to increased viscosity and reduced uniformity of the dispersion. Further, the mixture slurry manufactured using such a CNT dispersion may also become highly viscous and non-uniform, potentially leading to decreased coatability of the electrode film and reduced uniformity of the electrode film.

On the other hand, if the bulk density becomes too large due to pretreatment or other factors, the preparation of the CNT dispersion (specifically, the ease of preparation and wettability in the dispersion medium) becomes easier, and the final viscosity of the dispersion tends to be lower. However, as the specific surface area of CNTs increases, a large amount of dispersant is required to obtain sufficient stability, which is undesirable from the viewpoint of electrode film design. Further, CNTs in an agglomerated state with high bulk density, or CNTs that have been broken into short pieces due to high-intensity dispersion to resolve agglomeration, may have difficulty forming a well-developed conductive network, potentially leading to deterioration in conductivity. Furthermore, if the viscosity of the mixture slurry becomes too low, migration may occur during the drying process when manufacturing the electrode film, potentially resulting in non-uniformity of the electrode film. Further, in the case of pretreating CNTs to the extent that the bulk density becomes excessively high, there is a risk that Zr may inhibit the adsorption of dispersant onto the CNTs, and there is also concern about a decrease in discharge capacity due to Zr adhering to the active material.

In light of these considerations, by obtaining CNTs with both bulk density and Zr content appropriately controlled, it is possible to achieve a CNT dispersion that excels in dispersibility, stability, and conductivity. Furthermore, it is possible to obtain an electrode film with a well-developed conductive network, and to provide a secondary battery with high output, high capacity, and long life.

By adjusting the bulk density X of CNTs to a range of 0.045 g/cm³ to 0.125 g/cm³, and adjusting the Zr content of CNTs to a range of 3 ppm to 500 ppm, CNTs with excellent performance may be obtained. More preferably, it is desirable to adjust the bulk density X of CNTs to a range of 0.095 g/cm³ to 0.125 g/cm³, adjust the Zr content of CNTs to a range of 5 ppm to 500 ppm, and adjust the maximum solvent absorption capacity Y to 8.0 or higher.

Furthermore, the present invention's inventors have found that in the case of adopting dry treatment as a pretreatment for CNTs, it is necessary to improve wettability to a certain extent while maintaining the high aspect ratio of CNTs to some degree. Therefore, as an indicator for determining the endpoint of dry treatment of CNTs, in other words, the degree of CNT treatment, by setting the bulk density X of CNTs and the Zr content of CNTs within the above range, CNTs with excellent dispersibility and conductivity may be obtained.

In other words, in the case of adopting dry treatment as a pretreatment for CNTs, the treatment is performed while managing the bulk density X of CNTs and the Zr content of CNTs. Although it is preferable to adjust the dry treatment conditions for CNTs as appropriate by evaluating the dispersibility of the CNT dispersion, and the conductivity of the mixture slurry and electrode film using the same, for the reasons mentioned above, during the dry treatment, the bulk density X and Zr content may be measured and directly used as indicators to obtain the desired treatment state for these physical properties.

The change rate between the bulk density X after dry grinding and the bulk density X' before dry grinding is preferably −60% or more and 1000% or less, more preferably −20% or more and 500% or less, and even more preferably −5% or more and 250% or less. By having the change rate in bulk density within the above range, CNTs exhibiting superior dispersibility and high conductivity may be obtained.

The change rate in bulk density is determined by the following formula:

Bulk density change rate (%)=($X/X'$-1)×100

The change rate between the powder resistance value Re after dry grinding and the powder resistance value Re' before dry grinding is preferably 1% or more and 20% or less, more preferably 2% or more and 18% or less, and even more preferably 3% or more and 15% or less. By having the change rate in powder resistivity within the above range, CNTs exhibiting superior dispersibility and high conductivity may be obtained.

The rate change in powder resistance value is determined by the following formula:

Powder resistance value change rate (%)=(Re/Re'-1)×100

The average fiber length of CNTs after dry grinding is preferably 0.1 μm or more and 5 μm or less, may be 0.2 μm or more and 2 μm or less, or may be 0.5 μm or more and 1 μm or less. Carbon nanotubes with a fiber length of 0.1 μm or more may further enhance conductivity and toughness. Further, carbon nanotubes with a fiber length of 1 μm or less may further prevent viscosity increase of the dispersion by suppressing the occurrence of agglomeration even if defibration progresses during the dispersion treatment of CNTs in non-aqueous dispersion medium. Further, while the average fiber length of CNTs before dry grinding is not particularly limited, it is preferably 0.6 μm or more, more preferably 0.9 μm or more, and even more preferably 1.2 μm or more, for the reason that it is desirable to appropriately control the fiber length distribution of CNTs by performing dry grinding treatment. Further, it is preferably 100 nm or less, more preferably 80 nm or less, and even more preferably 60 nm or less. The average fiber length of CNTs may be calculated by the aforementioned method. It should be noted that the change rate between the average fiber length of CNTs after dry grinding and the average fiber length of CNTs before dry grinding is not particularly limited, for the reason that it is preferable to appropriately adjust the dry treatment conditions, etc., according to the average outer diameter and average fiber length of CNTs before dry treatment.

Untreated CNTs are not particularly limited, and CNTs manufactured by any method may be used.

CNT may generally be produced by laser ablation method, arc discharge method, thermal CVD method, plasma CVD method, and combustion method, but are not limited thereto. For example, CNTs may be manufactured by reacting a carbon source with a catalyst at 500 to 1000° C. in an atmosphere with an oxygen concentration of 1 volume % or less. Further, any conventionally known raw gas may be used as the carbon source for untreated CNTs. For example, hydrocarbons represented by methane, ethylene, propane, butane, and acetylene, carbon monoxide, and alcohols may be used as raw gases containing carbon, but are not limited thereto. Particularly from the viewpoint of ease of use, it is desirable to use at least one of hydrocarbons and alcohols as the raw gas.

Further, untreated CNTs typically exist as secondary particles. The shape of these secondary particles may be, for example, a state in which general primary particles of CNTs are intricately entangled. They may also be an aggregate of straight CNTs. Secondary particles that are aggregates of straight CNTs are easier to disentangle compared to those that are entangled. Further, straight CNTs have better dispersibility than entangled CNTs, and may therefore be suitably used. It is preferable to apply grinding treatment to these untreated CNTs to meet the desired physical properties.

Furthermore, the untreated CNTs may be surface-treated CNTs. Further, the CNTs may be CNT derivatives with functional groups such as carboxyl groups. In the case of grinding treatment, these treatments may be performed before, after, simultaneously with, or in any combination of these with the grinding treatment.

In addition, the distribution of fiber length, pore size, etc. of untreated CNTs varies depending on the type. Thus, the compression of CNTs and the way CNTs break during treatments such as dry grinding differ depending on the type of CNTs. Since the distribution of various characteristics of the obtained CNTs varies depending on the type of CNTs and the treatment method, it is advisable to apply an appropriate treatment method according to the type of CNTs. For example, as a treatment method, the selection of grinding treatment device and the processing time may be adjusted as appropriate.

Carbon Nanotube Dispersion

The CNT dispersion of the present embodiment includes the above-mentioned CNTs, a dispersant, and a non-aqueous dispersion medium. The details of the CNTs are as described above.

Dispersant

The CNT dispersion includes a dispersant. The dispersant is not particularly limited, but one that may stabilize the dispersion of CNTs in the CNT dispersion is preferable. Both resin-type dispersants and surfactants may be used as dispersants, but resin-type dispersants are preferred because they have strong adsorption to CNTs and provide good dispersion stability. An appropriate type of dispersant may be used in a suitable formulation amount according to the characteristics required for the dispersion of CNTs.

As resin-type dispersants, (meth)acrylic polymers, polymers derived from ethylenic unsaturated hydrocarbons, cellulose derivatives, and copolymers of these may be used.

As polymers derived from ethylenic unsaturated hydrocarbons, polyvinyl alcohol-based resins, polyvinylpyrrolidone-based resins, polyacrylonitrile-based resins, and nitrile rubbers may be mentioned. Polyvinyl alcohol-based resins include polyvinyl alcohol, modified polyvinyl alcohols having functional groups other than hydroxyl groups (for example, acetyl groups, sulfo groups, carboxyl groups, carbonyl groups, amino groups), polyvinyl alcohols modified by various salts, other anion or cation modified polyvinyl alcohols, and polyvinyl acetals (such as polyvinyl acetoacetal, polyvinyl butyral, etc.) modified by acetal (acetoacetal modification or butyral modification, etc.) with aldehydes. Polyacrylonitrile-based resins may be homopolymers of polyacrylonitrile, copolymers of polyacrylonitrile, or modifications thereof, and preferably include polyacrylonitrile-based resins having at least one group selected from active hydrogen groups such as hydroxyl groups, carboxyl groups, primary amino groups, secondary amino groups, and mercapto groups, basic groups, and alkyl groups introduced from (meth)acrylic acid alkyl esters or α-olefins. For example, the acrylonitrile copolymer described in Japanese Patent Application Laid-Open Publication No. 2020-163362 may be used. Nitrile rubbers include acrylonitrile butadiene rubber and hydrogenated acrylonitrile butadiene rubber. Cellulose derivatives include cellulose acetate, cellulose butyrate, cyanoethyl cellulose, ethyl hydroxyethyl cellulose, nitrocellulose, methyl cellulose, ethyl cellulose, hydroxyethyl cellulose, hydroxypropyl cellulose, hydroxypropyl methyl cellulose, carboxymethyl cellulose, or copolymers thereof. Further, dispersants described in International Publication No. WO 2008/108360, Japanese Patent Application Laid-Open Publication No. 2018-192379, Japanese Patent Application Laid-Open Publication No. 2019-087304, Japanese Patent Application Laid-Open Publication No. 2020-011934, and Japanese Patent Application Laid-Open Publication No. 2009-026744 may be used, but are not limited thereto. Particularly preferred are methyl cellulose, ethyl cellulose, polyvinyl alcohol, polyvinyl butyral, polyvinylpyrrolidone, homopolymers of polyacrylonitrile, copolymers of polyacrylonitrile, and hydrogenated acrylonitrile butadiene rubber. Polymers with other substituents introduced into part of these polymers or modified polymers may also be used.

The weight average molecular weight of the resin-type dispersant is preferably 500,000 or less, and more preferably 300,000 or less, from the viewpoint of affinity balance between the CNT to be dispersed and the non-aqueous dispersion medium, and from the viewpoint of resistance to the electrolyte. Further, it is preferably 3,000 or more, and more preferably 5,000 or more. The resin-type dispersant may be used alone or in combination of two or more types. The weight average molecular weight is the polystyrene-equivalent weight average molecular weight determined by gel permeation chromatography (GPC) measurement.

As commercially available polyvinyl alcohol-based resins, various grades may be obtained under trade names such as Kuraray Poval (polyvinyl alcohol resin manufactured by Kuraray), Gohsenol, Gosenex (polyvinyl alcohol resin manufactured by Nippon Synthetic Chem Industry Co., Ltd.), Denka Poval (polyvinyl alcohol resin manufactured by Denka Company Limited), J-Poval (polyvinyl alcohol resin manufactured by Japan VAM & POVAL). Further, modified polyvinyl alcohols with various functional groups may be similarly obtained. Further, those synthesized by known synthesis methods may be used. As commercially available polyvinylpyrrolidone-based resins, specifically, Luvitec K17 (K value: 15.0~19.0, low molecular weight), K30 (K value 27.0~33.0), K90 (K value 88.0~92.0), K90HM (K value 92.0~96.0, high molecular weight) (manufactured by BASF Japan Ltd.), K15, K30, K90, K120 (manufactured by ISP), Polyvinylpyrrolidone K30 (K value 27.0~33.0), K90 (K value 88.0~96.0) (manufactured by Nippon Shokubai Co., Ltd.), PVP K12 (K value 10~14), K15 (K value 13~19), K30 (K value 26~35), K60 (K value 50~62), K90 (K value 88~100) (manufactured by DSP Gokyo Food & Chemical Co., Ltd.) may be mentioned. From the viewpoint of preventing viscosity increase, it is preferable for polyvinylpyrrolidone to have a K value of 150 or less, more preferably 100 or less, and even more preferably 85 or less. As commercially available nitrile rubber types, various grades with different nitrile ratios, hydrogenation rates, and molecular weights may be obtained under trade names such as Therban (hydrogenated nitrile rubber manufactured by Arlanxeo), Baymod (nitrile rubber manufactured by Arlanxeo), Zetpole (hydrogenated nitrile rubber manufactured by Zeon Corporation), Nipole NBR (nitrile rubber manufactured by Zeon Corporation). Further, those synthesized by known synthesis methods may be used.

In place of or in addition to the above-mentioned resin-type dispersant, a surfactant may be used. Surfactants are classified into ionic surfactants including anionic, cationic, and amphoteric types, and non-ionic surfactants.

The CNT dispersion may further include a base. Including a base in the CNT dispersion is preferable, as it enhances the wettability of CNTs to the dispersion medium, thereby improving dispersibility or dispersion stability. The base to be added may be at least one selected from the group consisting of inorganic bases, inorganic metal salts, organic bases, and organic metal salts. The total amount of these is preferably 0.001 to 0.1 mass % with respect to the total amount of the CNT dispersion, and more preferably 0.005 to 0.05 mass %. If the amount of base added is excessive, it may cause corrosion of the dispersion equipment and/or the interior of the battery.

In this case, the water content of the base to be added is preferably less than 5 mass %, more preferably less than 3 mass %, and even more preferably less than 2 mass %. If a large amount of water is included in the base to be added, there is a risk that the adsorption of the dispersant to the CNTs may decrease, making it difficult to stably maintain the CNTs in the non-aqueous dispersion medium. By keeping the water content within the above range, it is possible to prevent problems such as gelation of the mixture slurry prepared by mixing with the active material, or degradation of the positive electrode due to the generation of acids such as HF caused by residual moisture in the positive electrode. There is a problem that when moisture remains in the positive electrode, degradation of the positive electrode occurs due to the generation of acids such as HF. Further, if moisture is present in alkali metal hydroxides such as LiOH, there is also a problem that the paste containing the positive electrode active material tends to gel during the preparation of the positive electrode, making electrode formation difficult.

As inorganic bases and inorganic metal salts, for example, chlorides, hydroxides, carbonates, nitrates, sulfates, phosphates, borates of alkali metals or alkaline earth metals; and ammonium hydroxide may be mentioned. Among these, from the viewpoint of easily supplying cations, hydroxides or alkoxides of alkali metals or alkaline earth metals are preferable. The alkali metal hydroxide may be, for example, lithium hydroxide, sodium hydroxide, potassium hydroxide, and the like. The hydroxides of alkaline earth metals may be, for example, calcium hydroxide, magnesium hydroxide, and the like. Among these, it is more preferable to use at least one selected from the group consisting of lithium hydroxide, sodium hydroxide, and potassium hydroxide. It is noted that the metal contained in the inorganic base may be a transition metal.

As organic bases, primary, secondary, and tertiary amine compounds (such as alkylamines, amino alcohols, etc.) with 1 to 40 carbon atoms which may have substituents, or organic hydroxides may be mentioned.

As primary alkylamines with 1 to 40 carbon atoms which may have substituents, alkylamines such as propylamine, butylamine, isobutylamine, octylamine, 2-ethylhexylamine, laurylamine; amino alcohols such as 2-aminoethanol, 3-aminopropanol; and 3-ethoxypropylamine, etc. may be mentioned.

As secondary alkylamines with 1 to 40 carbon atoms which may have substituents, alkylamines such as dibutylamine, diisobutylamine, N-methylhexylamine, dioctylamine; amino alcohols such as 2-methylaminoethanol, etc. may be mentioned.

As tertiary alkylamines with 1 to 40 carbon atoms which may have substituents, alkylamines such as triethylamine, tributylamine, N,N-dimethylbutylamine, N,N-diisopropylethylamine, dimethyloctylamine, trioctylamine, dimethyldecylamine; and triethanolamine, 2-(dimethylamino)ethanol, etc. may be mentioned.

Organic hydroxides are salts containing organic cations and hydroxide ions. As organic hydroxides, for example, trimethyl-2-hydroxyethylammonium hydroxide, tetramethylammonium hydroxide, trimethylphenylammonium hydroxide, 3-trifluoromethyl-phenyltrimethylammonium hydroxide, benzyltrimethylammonium hydroxide, etc. may be mentioned.

Among these, from the viewpoint of their effect on CNTs, it is more preferable to use at least one selected from the group consisting of 2-aminoethanol, 3-aminopropanol, triethanolamine, and trimethyl-2-hydroxyethylammonium hydroxide.

As organic metal salts, for example, alkali metal alkoxides, alkali metal acetates, etc. may be mentioned. As alkali metal alkoxides, for example, lithium methoxide, lithium ethoxide, lithium propoxide, lithium t-butoxide, lithium n-butoxide, sodium methoxide, sodium ethoxide, sodium propoxide, sodium t-butoxide, sodium n-butoxide, potassium methoxide, potassium ethoxide, potassium propoxide, potassium t-butoxide, potassium n-butoxide, etc. may be mentioned. Among these, from the viewpoint of easily supplying cations, sodium t-butoxide is preferable. It should be noted that the metal possessed by the organic base may be a transition metal.

The CNT dispersion may further include an acid. Including an acid in the CNT dispersion is preferable because it may suppress the polymerization of the resin, and the accompanying increase in viscosity and gelation of the mixture slurry for lithium-ion battery positive electrodes. The acid to be added may be either an inorganic acid or an organic acid. The total amount of these acids is preferably 0.001 to 1.0 mass % with respect to the total amount of the CNT dispersion, and more preferably 0.005 to 0.5 mass %. If the amount of acid added is too large, there is a risk of reducing the adsorption of the dispersant to the CNTs and its dispersing ability.

As inorganic acids, for example, hydrochloric acid, sulfuric acid, nitric acid, phosphoric acid, etc. may be mentioned. As organic acids, carboxylic acid compounds, sulfonic acid compounds, etc. may be mentioned. As carboxylic acid compounds, formic acid, acetic acid, propionic acid, butyric acid, tartaric acid, oxalic acid, malonic acid, succinic acid, glutaric acid, adipic acid, pimelic acid, suberic acid, (meth)acrylic acid, crotonic acid, fumaric acid, maleic acid, itaconic acid, citraconic acid, fluoroacetic acid, etc. may be mentioned. As sulfonic acid compounds, methanesulfonic acid, p-toluenesulfonic acid, dodecylbenzenesulfonic acid, dinonylnaphthalenesulfonic acid, dinonylnaphthalenedisulfonic acid, etc. may be mentioned. Further, anhydrides, hydrates, or acids with partially salted forms of the above acids may also be used. These may be used alone or in combination of two or more types.

Non-Aqueous Dispersion Medium

The CNT dispersion includes a non-aqueous dispersion medium as the dispersion medium. The non-aqueous dispersion medium is not particularly limited, but it is preferably a high dielectric constant solvent, and it is preferable to include a solvent consisting of any one type of high dielectric constant solvent, or a mixed solvent consisting of two or more types. Further, one or more other solvents may be mixed with the high dielectric constant solvent for use.

As high dielectric constant solvents, amide-based (N-methyl-2-pyrrolidone (NMP), N-ethyl-2-pyrrolidone (NEP), N,N-dimethylformamide, N,N-dimethylacetamide, N,N-diethylacetamide, N-methylcaprolactam, etc.), heterocyclic-based (cyclohexylpyrrolidone, γ-butyrolactone, etc.), sulfoxide-based (dimethyl sulfoxide, etc.), sulfone-based (hexamethylphosphorotriamide, sulfolane, etc.), lower ketone-based (acetone, methyl ethyl ketone, etc.), carbonate-based (diethyl carbonate, dimethyl carbonate, ethyl methyl carbonate, fluoroethylene carbonate, propylene carbonate, ethylene carbonate), and others such as tetrahydrofuran, urea, acetonitrile, etc. may be used. The relative dielectric constant of the high dielectric constant solvent may be the value described in the Solvent Handbook, etc., and it is preferably 2.5 or more at 20° C.

The non-aqueous dispersion medium preferably includes an amide-based organic solvent in view of the solubility of the dispersant and binder resin, or the wettability of CNTs to the dispersion medium. It is more preferable to include at least one selected from the group consisting of N-methyl-2-pyrrolidone and N-ethyl-2-pyrrolidone.

The content of the amide-based organic solvent is preferably 60 mass % or more, more preferably 80 mass % or more, and even more preferably 85 mass % or more with respect to the total mass of the non-aqueous dispersion medium. From the viewpoint of handling, it is even more preferable to use N-methyl-2-pyrrolidone alone.

The CNT dispersion may optionally include, as appropriate, other additives such as wetting agents, wetting penetrants, leveling agents, and other optional components to an extent that does not hinder the purpose of the present invention. The optional components may be added at any timing, such as before the preparation of the CNT dispersion, during mixing, after mixing, or any combination thereof.

Even if optional components are included, they may be within a range that does not hinder the purpose of the present invention, and since the CNT dispersion does not substantially include active material, the content of CNT and dispersant in the CNT dispersion is 60 mass % or more, preferably 70 mass % or more, more preferably 80 mass % or more, even more preferably 90 mass % or more, and still more preferably 95 mass % or more based on the non-volatile components, i.e., the solid content of the CNT dispersion. Further, it may be 100 mass % or less.

As other conductive materials besides CNT, carbon black may be included. It is preferable that carbon black is included in the CNT dispersion to an extent that does not impair the effects of the present invention. With respect to the total mass of carbon black and CNT, CNT is preferably 1 to 80 mass %, and more preferably 1 to 50 mass %. If the above range is satisfied, even if carbon black is included, the dispersion state of CNT may be controlled and high dispersibility and fluidity may be better maintained. Furthermore, with respect to the total mass of the CNT dispersion, carbon black is preferably 20 mass % or less, and more preferably 15 mass % or less.

The stage of adding carbon black to the CNT dispersion is not particularly limited, and may be before, after, simultaneously with, or any combination of these, with respect to the addition of CNT. Another example of a method for manufacturing a CNT dispersion containing carbon black is a method of adding carbon black before, after, simultaneously with, or any combination of these, with respect to adding binder resin to the CNT dispersion. In this method, it is preferable that carbon black is added in a state where CNT is dispersed in the CNT dispersion. Alternatively, it may be a combination of these methods. In other words, carbon black may be further added before, after, simultaneously with, or any combination of these, with respect to adding binder resin to the CNT dispersion containing carbon black.

Method for Manufacturing CNT Dispersion

The CNT dispersion of the present embodiment is characterized by including a process of mixing and dispersing the above-mentioned CNT, dispersant, and non-aqueous dispersion medium. For example, it is preferable to manufacture by finely dispersing CNT, dispersant, and non-aqueous dispersion medium using a dispersion device to perform dispersion treatment. The dispersion device used for such treatment is not particularly limited. It should be noted that the dispersion treatment may be a multi-stage process of two or more times, with the addition timing of the materials used being adjusted as desired.

Examples of dispersion devices used for dispersing CNT include kneaders, two-roll mills, three-roll mills, planetary mixers, ball mills, horizontal sand mills, vertical sand mills, annular bead mills, attritors, high shear mixers, high-pressure homogenizers, and ultrasonic homogenizers. Among these, it is preferable to use high shear mixers, high-pressure homogenizers, ultrasonic homogenizers, or a combination thereof in order to finely disperse CNT in the CNT dispersion and obtain suitable dispersibility. In particular, from the viewpoint of promoting the wetting of CNT and breaking up coarse particles, it is preferable to use a high shear mixer in the initial dispersion process, followed by a high-pressure homogenizer from the viewpoint of dispersing while maintaining the aspect ratio of CNT. The dispersibility of CNT may be further improved by performing multi-stage circulation dispersion with the high-pressure homogenizer. Further, by dispersing with a bead mill after dispersing with a high-pressure homogenizer, the dispersion state may be made uniform while maintaining the fiber length. Furthermore, for CNT according to some embodiments of the present invention where wettability has been improved by dry treatment or the like, by using a high shear mixer in the initial dispersion process, followed by dispersion with a bead mill, and further dispersion with a high-pressure homogenizer, CNT agglomerated with a certain force by dry treatment or the like may be sufficiently broken up and the dispersion state may be made uniform. When using a high-pressure homogenizer, the pressure of the homogenizing part of the high-pressure homogenizer is preferably 60 to 150 MPa, and more preferably 60 to 120 MPa.

Dispersion methods using dispersion devices include batch dispersion, pass dispersion, circulation dispersion, etc., and any of these methods may be used, or two or more methods can be combined. Batch dispersion is a method of performing dispersion using only the main body of the dispersion device without using piping, etc. It is preferable for small-scale production due to its simple handling. Pass dispersion is a dispersion method in which the main body of the dispersion device includes a tank for supplying the liquid to be dispersed and a tank for receiving the dispersed liquid through piping, and the liquid passes through the main body of the dispersion device. Further, circulation dispersion is a method in which the liquid that has passed through the main body of the dispersion device is returned to the tank supplying the liquid to be dispersed, and dispersion is performed while circulating. In all cases, the longer the processing time, the more the dispersion progresses, so the pass or circulation may be repeated until the desired dispersion state is reached, and the processing amount may be increased by changing the tank size or processing time. Pass dispersion is preferable in that it is easier to make the dispersion state uniform compared to circulation dispersion. Circulation dispersion is preferable in that the operation and manufacturing equipment are simpler compared to pass dispersion. In the dispersion process, the breaking up of agglomerated particles, the dissolution of conductive materials, wetting, and stabilization proceed sequentially or simultaneously, and the final dispersion state differs depending on how it progresses. Thus, it is preferable to manage the dispersion state at each dispersion step using various evaluation methods. For example, it may be managed using the methods described in the examples.

The dispersion device used for dispersing the CNT dispersion may include a heat exchanger or cooling liquid supply mechanism for cooling the CNT dispersion. By cooling the CNT dispersion or coarse dispersion that has become hot due to dispersion in advance, it is possible to suppress the generation of bubbles in the CNT dispersion, and also to suppress the residue of solids on the walls of the dispersion tank, etc. The liquid temperature of the CNT dispersion is not particularly limited, but it is preferable to control it to 25 to 75° C., and more preferably to control it to 40 to 65° C.

The CNT dispersion of the present invention preferably satisfies the following conditions for Formula (I) of the regression line from the viewpoint of microscopically controlling the dispersibility and fluidity of CNTs in the CNT dispersion: a determination coefficient $R^2$ of 0.85 or more, a slope a that satisfies $2 \leq a < 20$, and a y-intercept b that satisfies $-5 \leq b < 10$.

$$y = ax + b \qquad \text{Formula (I)}$$

(formula (I) is a regression line obtained by a least-squares method from a scatter plot with x plotted on a horizontal axis and y plotted on a vertical axis, measured using carbon nanotube dispersions with storage temperatures and durations of 40° C. for 1 day, 40° C. for 7 days, and 40° C. for 14 days, respectively, where i is a number of days elapsed during storage, $\eta_i$(Pa·s) is a shear viscosity at 25° C. and a shear rate of $1.0\ \text{s}^{-1}$ of a resin composition for secondary batteries when a storage temperature is 40° C., and $G^*_i$(Pa) is a complex modulus at 25° C. and a frequency of 1 Hz obtained by dynamic viscoelastic measurement, x is a natural logarithm ($\ln(\eta_i)$) of the shear viscosity $\eta_i$(Pa·s), y is the complex modulus $G^*_i$(Pa) at 25° C. and a frequency of 1 Hz, and i is 1, 7, and 14, with a manufacturing date of carbon nanotube dispersion being day 0).

By satisfying specific conditions in Formula (I), the CNT dispersion excels in dispersion stability of CNTs, and maintains its dispersibility and fluidity even after the passage of time. Further, by using this CNT dispersion, the dispersibility and fluidity are maintained even after adding the binder resin, and furthermore, it is possible to form a developed conductive network in the electrode film when manufacturing the electrode film. As a result, an electrode film with excellent adhesion to the current collector may be obtained, and a secondary battery with high output, high capacity, and long life may be achieved.

The CNT dispersion that satisfies specific conditions in Formula (I) may be obtained by appropriately controlling the types of CNTs, dispersants, and non-aqueous dispersion medium, as well as their content, mixing conditions, and dispersion conditions. In particular, it is effective to appropriately control the bulk density of CNTs and the Zr content in CNTs. For example, by using CNTs with pre-treatment conditions optimized to satisfy Formula (I), it may serve as an indicator for judging the good dispersion state in the CNT dispersion.

More specifically, since CNTs with appropriate bulk density and Zr content within a suitable range form a moderate aspect ratio and agglomeration state, when dispersed, a CNT dispersion may be obtained in which the entanglement between CNTs is sufficiently disentangled. Further, by not containing excessive Zr, a CNT dispersion with excellent storage stability may be obtained.

In this manner, the dispersibility of CNTs in the CNT dispersion may be evaluated by shear viscosity and complex modulus in dynamic viscoelastic measurement, and by adjusting the pre-treatment method of CNTs so that the shear viscosity and complex modulus of the CNT dispersion under specific conditions satisfy the above relationship, it is possible to maintain high dispersibility and fluidity even for CNT dispersions containing high concentrations of CNTs. The regression line of the present disclosure may be measured and obtained using CNT dispersions after storage at 40° C. for 1, 7, and 14 days.

In the case where the determination coefficient $R^2$ is less than 0.85, CNT agglomerates exist in the CNT dispersion, and agglomeration or sedimentation of CNTs may occur over time, which may lead to decreased adhesion of the electrode film or deterioration of battery performance. $R^2$ is preferably 0.90 or more, and more preferably 0.95 or more.

Here, the determination coefficient $R^2$ my be calculated from the square of Pearson's product-moment correlation coefficient.

The slope a may be $2 \leq a < 20$. In the case where the slope a is less than 2, CNTs in the CNT dispersion exist in a non-uniform state, which may lead to decreased adhesion of the electrode film or deterioration of battery performance.

Further, in the case where the slope a is 20 or more, agglomeration or sedimentation of CNTs may occur in the CNT dispersion, which may lead to increased electrode resistance or deterioration of battery performance.

The slope a is preferably 2 or more, more preferably 5 or more, and even more preferably 7 or more. Further, the slope a is preferably less than 20, more preferably less than 15, and even more preferably less than 14.

The Y-intercept b may be $-5 \leq b < 10$. In the case where the Y-intercept b is less than $-5$, CNTs in the CNT dispersion exist in a non-uniform state, which may lead to decreased adhesion of the electrode film or deterioration of battery performance. Further, in the case where the Y-intercept b is 10 or more, agglomeration or sedimentation of CNTs may occur in the CNT dispersion, which may lead to increased electrode resistance or deterioration of battery performance.

The Y-intercept b is preferably $-5$ or more, more preferably $-3$ or more, and even more preferably greater than 0. Further, the Y-intercept b is preferably less than 10, more preferably less than 8, and even more preferably less than 6.

By controlling the dispersion state of CNTs and making the CNT dispersion satisfy specific conditions of Formula (I), it is possible to simultaneously achieve dispersion stability of the CNT dispersion, temporal stability, adhesion between the electrode film and the current collector, and battery characteristics.

i represents the number of days elapsed during storage, with the manufacturing date of the CNT dispersion set as day 0, and i is 1, 7, and 14. That is, Formula (I) may be used to obtain a regression line from 3 points plotted for x and y by measuring the shear viscosity and complex modulus using the CNT dispersion after storage at 40° C. for 1, 7, and 14 days, respectively, from the manufacturing date.

x is a natural logarithm ($\ln(\eta_i)$) of the shear viscosity $\eta_i$(Pa·s) at 25° C. and a shear rate of $1.0\ \text{s}^{-1}$, Here, the shear viscosity $\eta_i$(Pa·s) represents the shear viscosity $\eta_i$(Pa·s) measured using the CNT dispersion after storage for i days at 40° C.

y is the complex modulus $G^*_i$(Pa) at 25° C. and a frequency of 1 Hz, obtained by dynamic viscoelastic measurement. Here, the complex modulus $G^*_i$(Pa) represents the complex modulus $G^*$(Pa) measured using the CNT dispersion after storage for i days at 40° C.

The shear viscosity $\eta_i$(Pa·s) of the CNT dispersion is the measured value at 25° C. and a shear rate of $1.0\ \text{s}^{-1}$, and the complex modulus $G^*$(Pa) is the measured value at 25° C. and a frequency of 1 Hz.

Specifically, measurements may be performed using the method described in the examples. Although the shear rate of the CNT dispersion tends to decrease as the dispersibility of CNTs improves, in cases where the fiber length of CNTs is large, even if the CNTs are uniformly and stably dispersed in the medium, the value itself may be high due to the structural viscosity of the CNTs themselves. Further, the shear rate changes not only due to the dispersion state of CNTs but also due to the entanglement of CNTs, dispersants, and other resin components, as well as the influence of intermolecular forces among these components.

Further, the complex modulus indicates the hardness of the CNT dispersion and tends to decrease as the dispersibility of CNTs improves and as the CNT dispersion becomes less viscous. However, similar to the shear viscosity, in cases where the CNTs themselves have structural viscosity, the CNT dispersion may show high values even if the CNTs are uniformly and stably dispersed in the medium. Further, the shear rate changes not only due to the dispersion state of CNTs but also due to the entanglement of CNTs, dispersants, and other resin components, as well as the influence of intermolecular forces among these components.

The shear viscosity $\eta_i$(Pa·s) of the CNT dispersion at a temperature of 25° C. and a shear rate of 1.0 s$^{-1}$ is preferably 0.05 or more, more preferably 0.20 or more, and even more preferably 0.80 or more. By having the shear viscosity $\eta$ within the above range, a CNT dispersion in which CNTs are sufficiently disentangled and uniformly dispersed may be obtained, resulting in high composite material adhesion and excellent battery performance.

Further, the shear viscosity $\eta$ is preferably 3.0 or less, more preferably 2.5 or less, and even more preferably 2.0 or less. By having the shear viscosity $\eta$ within the above range, a CNT dispersion may be obtained in which CNTs are stably dispersed without agglomeration or sedimentation, resulting in excellent battery performance.

The complex modulus G*(Pa) of the CNT dispersion at a temperature of 25° C. and a frequency of 1 Hz is preferably 0.80 or more, more preferably 2.0 or more, and even more preferably 4.0 or more. By having the complex modulus G* within the above range, a CNT dispersion in which CNTs are sufficiently disentangled and uniformly dispersed may be obtained, resulting in high composite material adhesion and excellent battery performance.

Further, the complex modulus G*(Pa) is preferably 100.0 or less, more preferably 50.0 or less, and even more preferably 10.0 or less. By having the complex modulus G* within the above range, a CNT dispersion may be obtained in which CNTs are stably dispersed without agglomeration or sedimentation, resulting in excellent battery performance.

Further, the degree of disentanglement of CNTs in the CNT dispersion may also be evaluated by the filtration rate of the CNT dispersion. More specifically, it may be evaluated by diluting the CNT dispersion three times with a non-aqueous dispersion medium and measuring the time it takes for the entire volume to pass through when the CNT dispersion is vacuum filtered. This is because if there are slight agglomerates derived from CNTs or other resin components in the CNT dispersion, these agglomerates are either not able to pass through the filter or slow down the filtration rate. Further, in cases where the dispersion state of the CNT dispersion is unstable, diluting the CNT dispersion with a non-aqueous dispersion medium easily causes dispersion shock, and agglomerates are noticeably confirmed. As a result, similarly, they are either not able to pass through the filter or slow down the filtration rate.

For the above reasons, the filtration rate may be used as one indicator to evaluate the dispersion state and dispersion stability of CNTs in the CNT dispersion, as well as the fluidity of the CNT dispersion. More specifically, it may be measured according to the method described in the examples.

Further, the fluidity and dispersion stability of the CNT dispersion may be evaluated by confirming the acid stability thereof. More specifically, it may be evaluated by adding acid to the CNT dispersion, measuring the initial viscosity of the CNT dispersion containing acid and the viscosity after storing the CNT dispersion containing acid at 40° C. for 7 days, and then calculating the change rate in viscosity after 7 days of storage at 40° C. compared to the initial viscosity. In cases where CNTs are stably dispersed, even if acid is added to the CNT dispersion, the dispersibility of CNTs does not collapse, and it maintains good viscosity over time. On the other hand, even if CNTs appear to be in a good dispersion state at the initial stage, if the dispersibility of CNTs is insufficient, CNTs that are not adsorbed by the dispersant agglomerates and cause poor dispersion when acid is added, resulting in an increase in viscosity of the CNT dispersion over time. By evaluating under these conditions, the dispersion state and dispersion stability of CNTs in the CNT dispersion may be evaluated considering changes over time. More specifically, it may be measured according to the method described in the examples.

The average fiber length of CNTs in the CNT dispersion is preferably 0.1 μm or more, more preferably 0.2 μm or more, and even more preferably 0.3 μm or more. Further, it is preferably 20 μm or less, and more preferably 10 μm or less. It is noted that the average fiber length of CNTs in the CNT dispersion may be calculated by observing a sample prepared by diluting the CNT dispersion 50 times with a non-aqueous dispersion medium such as NMP, dropping it onto a substrate, and drying it, using a scanning electron microscope. In the observed image, 300 CNTs are randomly selected, the individual fiber lengths thereof are measured, and the average is calculated. In cases where the dispersion state of CNTs is unstable, diluting the CNT dispersion with a non-aqueous dispersion medium tends to cause dispersion shock easily, resulting in the formation of agglomerates and a tendency for the average fiber length to become smaller. For the above reasons, the dispersion stability may be evaluated based on the average fiber length of CNTs in the CNT dispersion.

The content of CNTs in the CNT dispersion is preferably 0.1 mass % or more, more preferably 0.5 mass % or more, and even more preferably 1 mass % or more, with respect to the total amount of the CNT dispersion. Further, it is preferably 20 mass % or less, more preferably 15 mass % or less, even more preferably 10 mass % or less, and most preferably 8 mass % or less. By setting the content within the above range, CNTs may be present in a good and stable manner. More preferably, the content is 0.1 mass % or more and 20 mass % or less, and even more preferably 0.5 mass % or more and 10 mass % or less.

In the CNT dispersion, the mass ratio of dispersant to CNT (dispersant/CNT) is preferably 0.01 or more, more preferably 0.05 or more, and even more preferably 0.1 or more. Further, it is preferably 1.5 or less, more preferably 1 or less, even more preferably 0.5 or less, and particularly preferably 0.40 or less. By setting the ratio within the above range, the dispersion stability of CNTs may be further enhanced. More preferably, the ratio is 0.01 or more and 1.5 or less, and even more preferably 0.1 or more and 1 or less.

The Zr content in the CNT dispersion is preferably 0.01 ppm or more, more preferably 0.1 ppm or more, and even more preferably 1 ppm or more. Further, it is preferably 300 ppm or less, more preferably 150 ppm or less, even more preferably 100 ppm or less, and particularly preferably 50 ppm or less. By setting the content within the above range, the dispersion stability of CNTs in the CNT dispersion may be further enhanced. More preferably, the Zr content is 0.01 ppm or more and 300 ppm or less, and even more preferably 0.1 ppm or more and 100 ppm or less.

CNTs in the CNT dispersion function as a conductive material. The CNT dispersion may include conductive materials other than CNTs. Other conductive materials include, for example, carbon materials such as carbon black, graphene, multi-layer graphene, and graphite. In the case of using conductive materials other than CNTs, carbon black is preferred from the viewpoint of dispersant adsorption performance, and examples include carbon blacks such as acetylene black, furnace black, and ketjen black. These carbon blacks may be neutral, acidic, or basic, and oxidized carbon black or graphitized carbon black may also be used.

The CNT dispersion may be prepared by separately preparing two or more types of CNTs with different average outer diameters and adding the same to the dispersion medium. In the case of using two or more types of CNTs with different average outer diameters, the average outer diameter of the first CNT is preferably 0.5 nm or more and less than 5 nm. The average outer diameter of the second CNT is preferably 1 nm or more and 20 nm or less. For example, a single-walled CNT may be used as the first CNT, and a multi-walled CNT may be used as the second CNT. In the case of using two or more types of CNTs with different average outer diameters, the mass ratio of the first CNT to the second CNT is preferably 1:50 to 50:1, more preferably 1:10 to 10:1, and even more preferably 1:5 to 5:1. By setting the mass ratio of the first CNT to the second CNT within the above range, entanglement between CNTs may be suppressed, resulting in a dispersion with excellent fluidity.

Carbon Nanotube Resin Composition

The carbon nanotube resin composition of the present embodiment may include the above-mentioned carbon nanotube dispersion and a binder resin. The details of the carbon nanotube dispersion are as described above. That is, the carbon nanotube resin composition may include carbon nanotubes, a dispersant, a non-aqueous dispersion medium, and a binder resin. The carbon nanotube resin composition may further include optional components. The details are as described above. The carbon nanotube resin composition may be used as a resin composition for secondary batteries.

The binder resin is not particularly limited as long as it is typically used as a binder resin for paints, and may be appropriately selected according to the purpose. The binder resin may be a resin that binds substances such as active materials, CNTs, and other conductive materials. Examples of the binder resin include: homopolymers or copolymers containing structural units such as ethylene, propylene, vinyl chloride, vinyl acetate, vinyl alcohol, maleic acid, acrylic acid, acrylic acid esters, methacrylic acid, methacrylic acid esters, acrylonitrile, styrene, vinyl butyral, vinyl acetal, and vinyl pyrrolidone; polyurethane resins, polyester resins, phenolic resins, epoxy resins, phenoxy resins, urea resins, melamine resins, alkyd resins, acrylic resins, formaldehyde resins, silicone resins, fluorine resins; cellulose resins such as carboxymethyl cellulose or its salts; elastomers such as hydrogenated or non-hydrogenated styrene-butadiene rubber and fluorine rubber; conductive resins such as polyaniline and polyacetylene. These may also be modified forms of these resins or copolymers of these resins. The binder resin may be used alone or in combination of two or more types. Among these, in the case of using as a binder resin for the positive electrode of a secondary battery, homopolymers or copolymers having fluorine atoms in the molecule are preferred from the viewpoint of resistance, for example, polyvinylidene fluoride, polyvinyl fluoride, polytetrafluoroethylene, their modified forms, copolymers, etc. Further, in the case of using as a binder resin for the negative electrode of a secondary battery, CMC (carboxymethyl cellulose or its salts), hydrogenated or non-hydrogenated styrene-butadiene rubber, polyacrylic acid, etc., which have good adhesion, are preferred.

In the CNT resin composition, the binder resin is preferably 0.5 to 30 mass % with respect to the total non-volatile content of the CNT resin composition, and more preferably 0.5 to 25 mass %.

The CNT resin composition is preferably obtained by adding the binder resin to the CNT dispersion and mixing.

The binder resin may be used in a solution (varnish) state where the binder resin is dispersed or dissolved in a dispersion medium or the like, but it is preferable to use it in a state without containing a dispersion medium, more preferably in a solid state, and particularly preferably in a powder state. By adding the powdered binder resin to the CNT dispersion, the amount of non-aqueous dispersion medium does not increase in the addition of the binder resin, thus enabling the provision of a CNT resin composition with high binder resin concentration and high non-volatile content concentration. Here, the form of the binder resin is not particularly limited, and may be, for example, pellets, powder, granules, flakes, chunks, chopped fibers, or the like.

The method of adding the binder resin to the CNT dispersion is not particularly limited, but it is preferable to add the binder resin while stirring the CNT dispersion using a stirring device. The stirring device is not particularly limited, but generally, a disper (stirring blade) or the like is used. As for its shape, there are various types such as propeller type, turbine type, etc., but it is not particularly limited as long as it is able to uniformly stir the CNT resin composition. Further, the stirring speed may be appropriately adjusted according to the size and rotation speed of the stirring blade. The stirring speed is not particularly limited as long as it is within the range acceptable in the actual operation process.

Secondary Battery Electrode Mixture Slurry

The mixture slurry of this embodiment may include the aforementioned carbon nanotube dispersion, binder resin, and active material. The mixture slurry of another embodiment may include the aforementioned carbon nanotube resin composition and active material. The details of the carbon nanotube resin composition are as described above. That is, the mixture slurry may include carbon nanotubes, dispersant, non-aqueous dispersion medium, binder resin, and active material. The mixture slurry may further include optional components. The details are as described above. The active material may be either a positive electrode active material or a negative electrode active material. The mixture slurry may be used as a mixture slurry for secondary battery electrodes, and may be either a mixture slurry for positive electrodes of secondary batteries or a mixture slurry for negative electrodes of secondary batteries.

The mixture slurry may appropriately include other optional components as needed, to the extent that they do not hinder the purpose of the present invention. The optional components may be added at any timing, such as before the preparation of the mixture slurry, during mixing, after mixing, or a combination of these. The optional components may be those described in the aforementioned CNT resin composition.

The active material may be either a positive electrode active material or a negative electrode active material. In this specification, the positive electrode active material and the negative electrode active material may be simply referred to as "active material". The active material is the material that forms the basis of the battery reaction, and is broadly classified into positive electrode active material and negative electrode active material based on the electromotive force. The mixture slurry is preferably in a slurry state to improve uniformity and processability.

Positive Electrode Active Material

The positive electrode active material is not particularly limited, but metal compounds such as metal oxides and metal sulfides capable of reversibly doping or intercalating lithium ions may be used. For example, lithium manganese composite oxides (e.g., $Li_xMn_2O_4$ or $LixMnO_2$), lithium nickel composite oxides (e.g., $Li_xNiO_2$), lithium cobalt composite oxides ($Li_xCoO_2$), lithium nickel cobalt composite oxides (e.g., $Li_xNi_{1-y}Co_yO_2$), lithium manganese cobalt composite oxides (e.g., $Li_xMn_yCo_{1-y}O_2$), lithium nickel manganese cobalt composite oxides (e.g., $Li_xNi_yCo_zMn_{1-y-z}O_2$), spinel-type lithium manganese nickel composite oxides (e.g., $Li_xMn_{2-y}Ni_yO_4$), etc., which are composite oxide powders of lithium and transition metals, lithium phosphate oxide powders having an olivine structure (e.g., $Li_xFePO_4$, $Li_xFe_{1-y}Mn_yPO_4$, $Li_xCoPO_4$, etc.), transition metal oxide powders such as manganese oxide, iron oxide, copper oxide, nickel oxide, vanadium oxides (e.g., $V_2O_5$, $V_6O_{13}$), titanium oxide, etc., transition metal sulfide powders such as iron sulfate ($Fe_2(SO_4)_3$), $TiS_2$ and FeS, etc. may be mentioned. However, x, y, and z are numbers, and $0<x<1$, $0<y<1$, $0<z<1$, and $0<y+z<1$. These positive electrode active materials may be used alone or in combination of two or more. Among these active materials, particularly those containing Ni and/or Mn (especially in cases where the total amount of Ni and/or Mn in the transition metals is 50 mol % or more) tend to become highly basic due to raw material-derived components or elution of metal ions, and as a result, gelation of the binder resin and deterioration of the dispersion state are likely to occur. Thus, in the case of batteries containing active materials containing Ni and/or Mn, the present embodiment is particularly effective.

Negative Electrode Active Material

The negative electrode active material is not particularly limited, but for example, metallic Li capable of reversibly doping or intercalating lithium ions, or its alloys, tin alloys, silicon alloy negative electrodes, metal oxide-based materials such as $Li_xTiO_2$, $Li_xFe_2O_3$, $Li_xFe_3O_4$, $Li_xWO_2$, conductive polymers such as polyacetylene, poly-p-phenylene, artificial graphites such as highly graphitized carbon materials, or carbonaceous powders such as natural graphite, and resin-baked carbon materials may be used.

However, x is a number, and $0<x<1$. These negative electrode active materials may be used alone or in combination of multiple types. Especially in the case of using a silicon alloy negative electrode, although it has a large theoretical capacity, its volume expansion is extremely large. Thus, it is preferable to use it in combination with artificial graphites such as highly graphitized carbon materials, or carbonaceous powders such as natural graphite, or resin-baked carbon materials.

The content of CNT in the mixture slurry is preferably 0.01 mass % or more, more preferably 0.03 mass % or more, and even more preferably 0.05 mass % or more, based on the mass of the active material (with the mass of the active material being 100 mass %). Further, it is preferably 10 mass % or less, more preferably 5 mass % or less, and even more preferably 3 mass % or less. If the content exceeds the above range, the filling amount of the active material in the electrode decreases, leading to a reduction in battery capacity. Further, if the content is below the above range, the conductivity of the electrode and battery may become insufficient.

The content of the dispersant in the mixture slurry is preferably 0.01 mass % or more, more preferably 0.02 mass % or more, based on the mass of the active material (with the mass of the active material being 100 mass %). Further, it is preferably 10 mass % or less, more preferably 5 mass % or less.

The content of the binder resin in the mixture slurry is preferably 0.1 mass % or more, more preferably 0.3 mass % or more, based on the mass of the active material (with the mass of the active material being 100 mass %). Further, it is preferably 20 mass % or less, more preferably 10 mass % or less.

The non-volatile content in the mixture slurry is preferably 40 mass % or more, more preferably 50 mass % or more, based on the mass of the mixture slurry (with the mass of the mixture slurry being 100 mass %). Further, it is preferably 90 mass % or less, more preferably 85 mass % or less.

As a method for preparing the mixture slurry, it is preferable to perform a process of further adding an active material to the CNT resin composition and stirring. The stirring device used for stirring is not particularly limited. For the stirring device, a disper, homogenizer, etc. may be used.

Further, the mixture slurry may further include carbon black, which functions as a conductive material. It is preferable that carbon black is included in the mixture slurry to an extent that does not impair the effects of the present invention, and with respect to the total amount of conductive materials including carbon black and CNT, CNT is preferably 1 to 80 mass %, more preferably 1 to 50 mass %. In these ranges, the dispersion state of CNT may be controlled, and high dispersibility and fluidity may be better maintained in a state including the binder resin. Furthermore, carbon black is preferably 10 mass % or less, more preferably 5 mass % or less, with respect to the total mass of the mixture slurry. It is noted that, the manufacturing method of the mixture slurry includes a process of adding an active material to the CNT resin composition, but it may include further adding carbon black before, after, simultaneously, or any combination of these, with adding the active material to this CNT resin composition. Alternatively, the active material may be added to a CNT resin composition that already includes carbon black, or the active material and carbon black may be further added to a CNT resin composition that already includes carbon black.

Electrode Film

The electrode film of the present embodiment is a coating film formed from the above-mentioned mixture slurry. That is, the electrode film may include CNT, a dispersant, a binder resin, and an active material. The active material may be either a positive electrode active material or a negative electrode active material. The electrode film may further include optional components. The details are as described above. The electrode film may be used as an electrode film for secondary battery electrodes, and may be either an electrode film for secondary battery positive electrodes or an electrode film for secondary battery negative electrodes. The electrode film may be a coating film obtained using the above-mentioned mixture slurry, and may be formed, for example, by coating and drying the mixture slurry. An electrode may be provided using the electrode film. The electrode may include a current collector and the electrode film. The electrode may be obtained by coating the mixture slurry on the current collector and drying to form a coating film. A positive electrode may be provided using an electrode film including a positive electrode active material, and a negative electrode may be provided using an electrode film including a negative electrode active material, and these positive and negative electrodes may be provided as positive and negative electrodes for a secondary battery, respectively.

The material and shape of the current collector are not particularly limited, and may be appropriately selected to suit various types of secondary batteries. For example, materials for the current collector include metals or alloys such as aluminum, copper, nickel, titanium, or stainless steel. Further, as for the shape, generally, a flat foil is used, but a roughened surface, a perforated foil, and a mesh-type current collector may also be used. The thickness of the current collector is preferably in the range of about 0.5 to 30 µm.

There are no particular restrictions on the method for coating the mixture slurry onto the current collector, and known methods may be used. Specifically, methods such as die coating, dip coating, roll coating, doctor coating, knife coating, spray coating, gravure coating, screen printing, or electrostatic coating may be mentioned. For drying methods after coating, natural drying, forced air drying machine, hot air drying machine, infrared heating machine, far-infrared heating machine, etc. may be used, but these are not particularly limited to these methods. Further, after coating the mixture slurry, rolling treatment may be performed using a flat press, calendar roll, etc. The thickness of the electrode film is, for example, 1 µm or more and 500 µm or less, and preferably 10 µm or more and 300 µm or less.

Secondary Battery

The secondary battery of the present embodiment includes a positive electrode, a negative electrode, and an electrolyte, wherein at least one of the positive and negative electrodes includes the above-mentioned electrode film. The positive and negative electrodes may each include a current collector and an electrode film. The details are as described above. It is more preferable that the secondary battery is a lithium-ion secondary battery.

For the positive electrode, an electrode film may be used that is prepared by coating and drying a mixture slurry containing a positive electrode active material on a current collector. For the negative electrode, an electrode film may be used that is prepared by coating and drying a mixture slurry containing a negative electrode active material on a current collector. The positive electrode active material and negative electrode active material may be those mentioned above. The mixture slurry may be prepared according to the method described above.

The electrolyte may be a liquid electrolyte, a gel electrolyte, or a solid electrolyte. For example, the liquid electrolyte may include an electrolyte salt such as a lithium salt and a non-aqueous dispersion medium.

Various known electrolyte salts in which ions are mobile may be used as the electrolyte salt. For example, lithium salts such as $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, LiI, LiBr, LiCl, $LiAlCl$, $LiHF_2$, LiSCN, or $LiBPh_4$ (where Ph is a phenyl group) may be mentioned, but these are not limited to these examples. It is preferable to use the electrolyte salt dissolved in a non-aqueous dispersion medium as an electrolyte solution.

As the non-aqueous dispersion medium, although not particularly limited, examples include: carbonates such as ethylene carbonate, propylene carbonate, butylene carbonate, dimethyl carbonate, ethyl methyl carbonate, and diethyl carbonate; lactones such as γ-butyrolactone, γ-valerolactone, and γ-octanoic lactone; glymes such as tetrahydrofuran, 2-methyltetrahydrofuran, 1,3-dioxolane, 4-methyl-1,3-dioxolane, 1,2-methoxyethane, 1,2-ethoxyethane, and 1,2-dibutoxyethane; esters such as methyl formate, methyl acetate, and methyl propionate; sulfoxides such as dimethyl sulfoxide and sulfolane; and nitriles such as acetonitrile. These solvents may be used independently or in combination of two or more.

The secondary battery preferably includes a separator. As the separator, for example, polyethylene nonwoven fabric, polypropylene nonwoven fabric, polyamide nonwoven fabric, and nonwoven fabrics subjected to hydrophilic treatment may be mentioned, but these are not limited to these examples.

The structure of the secondary battery is not particularly limited, but it typically includes a positive electrode and a negative electrode, and optionally a separator, and it may be formed in various shapes according to the intended use, such as paper type, cylindrical type, button type, laminated type, etc.

EXAMPLES

Hereinafter, the present invention is described more specifically with reference to examples. The present invention is not limited to the following examples as long as it is within the spirit of the present invention. Moreover, unless otherwise mentioned, "part" represents "part by mass" and "%" represents "mass %".

In the examples and comparative examples, the following CNTs were used.

BT1003M: LUCAN BT1003M, manufactured by LG Chem Ltd., multi-walled CNT, outer diameter 10~15 nm JENOTUBE10B: manufactured by JEIO, multi-walled CNT, outer diameter 7~12 nm In the examples and comparative examples, the following dispersants were used.

H-NBR1: Therban(R) AT 3404 (manufactured by ARLANXEO, hydrogenated acrylonitrile-butadiene rubber)

H-NBR2: Zetpole 2000L (manufactured by Nippon Zeon, hydrogenated acrylonitrile-butadiene rubber)

PVB: BL-10 (manufactured by Sekisui Chemical Co., Ltd., polyvinyl butyral)

PVP: K-30 (manufactured by ISP, polyvinyl pyrrolidone)

PVA: Kuraray Poval 3-86SD (manufactured by Kuraray, modified polyvinyl alcohol)

In the examples and comparative examples, the following binder resins were used.

PVDF: KF Polymer W #7300 (manufactured by Kureha, polyvinylidene fluoride resin)

PTFE: PTFE D-210C (manufactured by Daikin Industries, Ltd., polytetrafluoroethylene)

CNT

Table 1 shows the types of CNTs and manufacturing conditions. It is noted that in response to performing dry grinding, the endpoint indicator for the treatment of CNTs in the examples was set to be within the range of 0.045 g/cm³ to 0.125 g/cm³ for bulk density, and within the range of 3 ppm to 500 ppm for Zr content.

Example 1: CNT1

In a 60 L capacity dynamic mill, zirconia beads with a diameter of 8 mm were charged as grinding media at a filling rate of 70%, and BT1003M was supplied as the raw material CNT at a flow rate of 120±20 kg/h for a total of 100 kg, and processed for 2 hours using a circulation grinding method at a peripheral speed of 4 m/s to obtain CNT1. A sample was taken out, and it was confirmed that the bulk density was 0.062 g/cm$^3$ and the Zr content was 6 ppm, both within the specified ranges, and the treatment process was end. In the treatment process, cooling was performed by flowing cooling water (10° C.) into a vessel (flow rate 10 L/min) so that the powder temperature at the outlet was 45±10° C.

Examples 2 to 9: CNT2 to CNT9

CNT2 to CNT9 were obtained by performing dry grinding of CNTs in the same manner as Example 1, according to the raw material CNT, treatment time, treatment flow rate, and dry dispersion method described in Table 1. In each treatment process, cooling was performed by flowing cooling water (10° C.) into a vessel (flow rate 10 L/min) so that the powder temperature at the outlet was 45±10° C.

Comparative Example 1: Comparative CNT1

BT1003M in an untreated state without grinding treatment was used as Comparative CNT1.

Comparative Example 2: Comparative CNT2

In a 60 L capacity dynamic mill, zirconia beads with a diameter of 8 mm were charged as grinding media at a filling rate of 70%, and BT1003M was supplied as the raw material CNT at a flow rate of 120±20 kg/h for a total of 100 kg, and processed for 15 hours using a circulation grinding method at a peripheral speed of 4 m/s to obtain Comparative CNT2. In the treatment process, cooling was performed by flowing cooling water (10° C.) into a vessel (flow rate 10 L/min) so that the powder temperature at the outlet was 45±10° C.

Comparative Example 3: Comparative CNT3

In a 60 L capacity dynamic mill, zirconia beads with a diameter of 8 mm were charged as grinding media at a filling rate of 70%, and BT1003M was supplied as the raw material CNT at a flow rate of 120±20 kg/h for a total of 100 kg, and processed for 15 hours using a circulation grinding method at a peripheral speed of 4 m/s to obtain Comparative CNT3. During the grinding treatment, room temperature water was run through the vessel to prevent equipment failure due to temperature rise.

Comparative Example 4: Comparative CNT4

In a 250 L capacity ball mill, zirconia beads with a diameter of 20 mm were charged as grinding media at a filling rate of 35%, and BT1003M was charged as the raw material CNT at 5 kg, and processed for 20 hours using a batch grinding method at a peripheral speed of 10 m/s to obtain Comparative CNT4.

Comparative Example 5: Comparative CNT5

In a 150 L capacity attrition mill, zirconia beads with a diameter of 8 mm were charged as grinding media at a filling rate of 70, and BT1003M was charged as the raw material CNT at 3 kg, and processed for 10 hours using a batch grinding method at a rotation speed of 150 min$^{-1}$ to obtain Comparative CNT5.

Physical Properties and Evaluation of CNT

The physical properties of CNT were measured and evaluated using the following methods. The obtained results are shown in Table 1.

Zr Content

The Zr content of CNT was measured according to the following procedure.

First, 0.1±0.02 g of CNT was placed in a decomposition vial, and nitric acid was added. The mixture was then decomposed using a microwave sample decomposition device. The decomposition liquid was adjusted to 25 ml by adding the purified water, and the solution was filtered through a membrane filter. The filtrate was analyzed by an ICP analyzer to determine the Zr content (ppm).

Bulk Density X of CNT

The bulk density was measured according to the following procedure in compliance with JIS K 5101-12-1.

First, as a pretreatment, CNT was vacuum-dried at a pretreatment temperature of 305° C. for a pretreatment time of 18 to 21 hours before measurement. Next, to break up the agglomerates formed during storage of the CNT powder and allow the obtained sample to flow freely into the measuring container until it overflows, a sufficient amount of sample for testing was prepared by passing it through a 0.5 mm sieve. The prepared CNT powder was allowed to fall freely into a 30 ml stainless steel cylindrical container, and after leveling off the raised portion at the top surface of the container, the mass of the CNT powder was determined, and the bulk density (g/cm$^3$) was then calculated by dividing this mass by the volume of the container.

Maximum Solvent Absorption Capacity Y of CNT

The maximum solvent absorption capacity Y is the maximum mass of solvent that CNT may absorb per unit mass of CNT when absorbing the solvent. The maximum mass of solvent absorbed by CNT is the total mass of solvent added dropwise to the CNT powder until just before the solvent begins to flow out from the CNT powder. The maximum solvent absorption capacity Y was measured according to the following procedure.

First, as a pretreatment, CNT was vacuum-dried at a pretreatment temperature of 305° C. for a pretreatment time of 18 to 21 hours before measurement. Then, under a 25° C. environment, 5 g (V(g)) of CNT powder was placed by free fall into a cylindrical polypropylene container with a diameter of 10 cm and left to settle. In this stationary state, N-methyl-2-pyrrolidone was added dropwise to the surface of the CNT powder in 0.5 g increments at 1-minute intervals. The total mass (W(g)) of N-methyl-2-pyrrolidone added until just before the droplet began to flow out on the surface of the CNT powder without being absorbed was measured. The maximum solvent absorption capacity was calculated using the following formula (5).

$$Y=W/V \quad \text{formula (5)}$$

(In formula (5), V is the mass of CNT, and W is the maximum mass of N-methyl-2-pyrrolidone absorbed by V(g) of CNT when N-methyl-2-pyrrolidone is added dropwise to the CNT under a 25° C. environment.

Powder Resistivity of CNT

A powder resistivity measurement device (Nitto Seiko Analytech Co., Ltd.: Lorester GP Powder Resistivity Measurement System MCP-PD-51) was used with a sample mass of 0.8 g. The volume resistivity [Ω·cm] of the conductive powder under various pressures was measured using a powder probe unit (four-probe ring electrode, electrode spacing 5.0 mm, electrode radius 1.0 mm, sample radius 12.5 mm) with an applied voltage limiter set to 90V. The value of powder resistivity of CNT at a density of 1 g/cm$^3$ was evaluated.

TABLE 1-1

Table 1-1

| Example Comparative Example | CNT | Raw material CNT | Manufacturing condition | | | |
|---|---|---|---|---|---|---|
| | | | Grinding device | Grinding type | Flow rate (kg/h) | Time (h) |
| Example 1 | CNT1 | BT1003M | Dynamic mill | Circulation-type | 120 ± 20 | 2 |
| Example 2 | CNT2 | BT1003M | Dynamic mill | Circulation-type | 120 ± 20 | 5 |
| Example 3 | CNT3 | BT1003M | Dynamic mill | Circulation-type | 120 ± 20 | 10 |
| Example 4 | CNT4 | BT1003M | Dynamic mill | Circulation-type | 60 ± 20 | 5 |
| Example 5 | CNT5 | BT1003M | Dynamic mill | Pass-type | 50 | 2 |
| Example 6 | CNT6 | BT1003M | Dynamic mill | Pass-type | 100 | 5 |
| Example 7 | CNT7 | BT1003M | Dynamic mill | Pass-type | 100 | 10 |
| Example 8 | CNT8 | JENOTUBE 10B | Dynamic mill | Circulation-type | 120 ± 20 | 5 |
| Example 9 | CNT9 | JENOTUBE 10B | Dynamic mill | Pass-type | 100 | 5 |
| Comparative Example 1 | Comparative CNT 1 | BT1003M | — | — | — | — |
| Comparative Example 2 | Comparative CNT 2 | BT1003M | Dynamic mill | Circulation-type | 120 ± 20 | 15 |
| Comparative Example 3 | Comparative CNT 3 | BT1003M | Dynamic mill | Circulation-type | 120 ± 20 | 15 |
| Comparative Example 4 | Comparative CNT 4 | BT1003M | Ball mill | Batch-type | — | 20 |
| Comparative Example 5 | Comparative CNT 5 | BT1003M | Attrition mill | Batch-type | — | 10 |

TABLE 1-2

Table 1-2

| Example Comparative Example | CNT | Zr content ppm | Maximum solvent absorption capacity Y — | Bulk density | | | Powder resistance value | | | Average fiber length | |
|---|---|---|---|---|---|---|---|---|---|---|---|
| | | | | Before dry grinding X' g/cm$^3$ | After dry grinding X g/cm$^3$ | Change rate % | Before dry grinding Re' (×10$^{-2}$) Ω·cm | After dry grinding Re (×10$^{-2}$) Ω·cm | Change rate % | Before dry grinding μm | After dry grinding μm |
| Example 1 | CNT1 | 6 | 17.3 | 0.113 | 0.062 | -45 | 1.8 | 1.85 | 3 | 11.2 | 1.9 |
| Example 2 | CNT2 | 38 | 12.7 | 0.113 | 0.099 | -12 | 1.8 | 2.04 | 13 | 11.2 | 0.8 |
| Example 3 | CNT3 | 187 | 8 | 0.113 | 0.119 | 5 | 1.8 | 2.14 | 19 | 11.2 | 0.2 |
| Example 4 | CNT4 | 40 | 11.8 | 0.113 | 0.096 | -15 | 1.8 | 2.05 | 14 | 11.2 | 0.9 |
| Example 5 | CNT5 | 3 | 17.1 | 0.113 | 0.05 | -56 | 1.8 | 1.86 | 3 | 11.2 | 2.1 |
| Example 6 | CNT6 | 15 | 12.4 | 0.113 | 0.097 | -14 | 1.8 | 2.06 | 14 | 11.2 | 0.9 |
| Example 7 | CNT7 | 70 | 8.4 | 0.113 | 0.118 | 4 | 1.8 | 2.15 | 19 | 11.2 | 0.3 |
| Example 8 | CNT8 | 35 | 12 | 0.045 | 0.097 | 116 | 1.25 | 1.48 | 18 | 19.1 | 1.0 |
| Example 9 | CNT9 | 14 | 12.1 | 0.045 | 0.095 | 111 | 1.25 | 1.49 | 19 | 19.1 | 1.1 |
| Comparative Example 1 | Comparative CNT 1 | 0 | 15 | 0.113 | 0.113 | — | 1.8 | — | — | 11.2 | — |
| Comparative Example 2 | Comparative CNT 2 | 289 | 5 | 0.113 | 0.128 | 13 | 1.8 | 2.3 | 28 | 11.2 | 0.1 |
| Comparative Example 3 | Comparative CNT 3 | 550 | 4.8 | 0.113 | 0.128 | 13 | 1.8 | 2.35 | 31 | 11.2 | 0.1 |
| Comparative Example 4 | Comparative CNT 4 | 530 | 8 | 0.113 | 0.129 | 14 | 1.8 | 2.3 | 28 | 11.2 | 0.1 |
| Comparative Example 5 | Comparative CNT 5 | 520 | 7.7 | 0.113 | 0.134 | 19 | 1.8 | 2.34 | 30 | 11.2 | 0.1 |

TABLE 1-3

Table 1-3

| Example Comparative Example | CNT | Bulk density after dry grinding X (g/cm³) | Maximum solvent absorption capacity Y | −200X + 37 | 200X − 17 | −200X + 27 | 200X + 7 |
|---|---|---|---|---|---|---|---|
| Example 1 | CNT1 | 0.062 | 17.3 | 24.6 | −4.6 | 14.6 | 19.4 |
| Example 2 | CNT2 | 0.099 | 12.7 | 17.2 | 2.8 | 7.2 | 26.8 |
| Example 3 | CNT3 | 0.119 | 8.0 | 13.2 | 6.8 | 3.2 | 30.8 |
| Example 4 | CNT4 | 0.096 | 11.8 | 17.8 | 2.2 | 7.8 | 26.2 |
| Example 5 | CNT5 | 0.05 | 17.1 | 27.0 | −7.0 | 17.0 | 17.0 |
| Example 6 | CNT6 | 0.097 | 12.4 | 17.6 | 2.4 | 7.6 | 26.4 |
| Example 7 | CNT7 | 0.118 | 8.4 | 13.4 | 6.6 | 3.4 | 30.6 |
| Example 8 | CNT8 | 0.097 | 12.0 | 17.6 | 2.4 | 7.6 | 26.4 |
| Example 9 | CNT9 | 0.095 | 12.1 | 18.0 | 2.0 | 8.0 | 26.0 |
| Comparative Example 1 | Comparative CNT 1 | 0.113 | 15.0 | 14.4 | 5.6 | 4.4 | 29.6 |
| Comparative Example 2 | Comparative CNT 2 | 0.128 | 5.0 | 11.4 | 8.6 | 1.4 | 32.6 |
| Comparative Example 3 | Comparative CNT 3 | 0.128 | 4.8 | 11.4 | 8.6 | 1.4 | 32.6 |
| Comparative Example 4 | Comparative CNT 4 | 0.129 | 8.0 | 11.2 | 8.8 | 1.2 | 32.8 |
| Comparative Example 5 | Comparative CNT 5 | 0.134 | 7.7 | 10.2 | 9.8 | 0.2 | 33.8 |

Further, in Table 1, the change rate in bulk density is the value calculated from the bulk density X after dry grinding and the bulk density X' before dry grinding using the following formula, and the change rate in powder resistance value is the value calculated from the powder resistance value Re after dry grinding and the powder resistance value Re' before dry grinding using the following formula.

Bulk density change rate (%)=(X/X'−1)×100

Powder resistance value change rate(0%)=(Re/Re'−1) λ100

CNT Dispersion

Example 1-1

According to the materials and composition shown in Table 2, the materials were added sequentially, and the CNT dispersion was prepared as follows.

First, NMP was added to a stainless steel jacketed tank and heated to 50° C. While stirring with a disper, the dispersant (H-NBR1) and additive (NaOH) were added, and then stirred for 1 hour to dissolve the dispersant (H-NBR1). Subsequently, while stirring with the disper, 25 parts by mass of CNT was added per 100 parts by mass of CNT (CNT1), and batch dispersion was performed for 5 minutes at a speed of 8,000 rpm using a high shear mixer (L5M-A, manufactured by SILVERSON) equipped with a square hole high shear screen. The above CNT addition and dispersion process was repeated 4 times to add the total amount of CNT, and batch dispersion was performed with the high shear mixer until the overall mixture became uniform and the dispersion particle size became 250 µm or less as measured by a grind gauge with a maximum groove depth of 300 µm. Next, the liquid to be dispersed was supplied from the jacketed tank to a bead mill (SC100, manufactured by Nippon Coke & Engineering) through piping, and circulation dispersion was performed for 5 minutes residence time under the conditions of bead diameter 1.25 mm, bead filling rate 60%, peripheral speed 10 m/s, and feed rate 800 g/min. Furthermore, the piping was switched to supply the liquid to be dispersed to a high-pressure homogenizer (Starburst Lab HJP-17007, manufactured by Sugino Machine), and circulation dispersion treatment was performed. The dispersion treatment was carried out using a single nozzle chamber, with a nozzle diameter of 0.25 mm and a pressure of 100 MPa. After dispersing until the viscosity at 60 rpm measured by a B-type viscometer (TOKI SANGYO, VIS-COMETER, MODEL: BL) of the liquid to be dispersed became 3,000 mPa·s or less, the treatment was performed with 15 passes through the high-pressure homogenizer to obtain CNT dispersion 1.

Examples 1-2 to 1-14

CNT dispersions 2 to 13 were obtained in the same manner as in Example 1-1, except for changes made according to the materials and compositions shown in Table 2.

Example 1-15

According to the materials and composition shown in Table 2, the materials were added sequentially, and the CNT dispersion was prepared as follows.

First, NMP was added to a stainless steel jacketed tank and heated to 50° C. While stirring with a disper, the dispersant (H-NBR1) and additive (NaOH) were added, and then stirred for 1 hour to dissolve the dispersant (H-NBR1). Subsequently, while stirring with the disper, 25 parts by mass of CNT was added per 100 parts by mass of CNT (CNT1), and batch dispersion was performed for 5 minutes at a speed of 8,000 rpm using a high shear mixer (L5M-A, manufactured by SILVERSON) equipped with a square hole high shear screen. The above CNT addition and dispersion process was repeated 4 times to add the total amount of CNT, and batch dispersion was performed with the high shear mixer until the overall mixture became uniform and the dispersion particle size became 250 µm or less as measured by a grind gauge with a maximum groove depth of 300 µm. Next, the liquid to be dispersed was supplied from the jacketed tank to a bead mill (SC100, manufactured by Nippon Coke & Engineering) through piping, and circulation dispersion was performed for 10 minutes residence time under the conditions of bead diameter 1.25 mm, bead filling rate 60%, peripheral speed 10 m/s, and feed rate 800 g/min. Furthermore, the piping was switched to supply the liquid to be dispersed to a high-pressure homogenizer (Starburst Lab HJP-17007, manufactured by Sugino Machine), and circulation dispersion treatment was performed. The dispersion treatment was carried out using a single nozzle chamber, with a nozzle diameter of 0.25 mm and a pressure of 100 MPa. After dispersing until the viscosity at 60 rpm measured by a B-type viscometer (TOKI SANGYO, VISCOMETER, MODEL: BL) of the liquid to be dispersed became 3,000 mPa·s or less, the treatment was performed with 15 passes through the high-pressure homogenizer to obtain CNT dispersion 15.

Comparative Examples 1-1 to 1-5

Comparative CNT dispersions 1 to 5 were obtained in the same manner as in Example 1-1, except for changes made according to the materials and compositions shown in Table 2.

It is noted that the additives and acids listed in Table 2 are as follows.

NaOH: Sodium hydroxide (manufactured by Tokyo Chemical Industry, purity >98.0%, granular form)

Aminoethanol: 2-Aminoethanol (manufactured by Tokyo Chemical Industry, purity >99.0%)

Measurement and Evaluation of Physical Properties of CNT Dispersion

The physical properties of the CNT dispersion were measured and evaluated using the following methods. The obtained results are shown in Tables 2 and 3.

Shear Viscosity of CNT Dispersion

The viscosity of the CNT dispersion at a shear rate of 1.0 s$^{-1}$ was evaluated by performing flow curve measurements in the shear rate range of 0.01 to 1000 s$^{-1}$ at 25° C. using a rheometer (RheoStress rotational rheometer, manufactured by Thermo Fisher Scientific Inc.) with a 60 mm diameter and a 2 degree cone. The time-dependent shear rate was evaluated by performing the above-mentioned flow curve measurement on the CNT dispersion in a stationary state, with the liquid temperature adjusted to 25° C.

Complex Modulus of CNT Dispersion

The complex modulus of the CNT dispersion was evaluated by performing dynamic viscoelastic measurements in the strain rate range of 0.01% to 5% at 25° C. and a frequency of 1 Hz using a rheometer (RheoStress rotational rheometer, manufactured by Thermo Fisher Scientific Inc.) with a 60 mm diameter and a 2 degree cone. The time-dependent shear rate was evaluated by performing the above-mentioned dynamic viscoelastic measurement on the CNT dispersion in a stationary state, with the liquid temperature adjusted to 25° C.

Table 3 shows the measurement results of shear viscosity η (Pa·s) and complex modulus G*(Pa) measured using the CNT dispersions of Examples 1-2, 1-8, and Comparative Example 1-3.

Table 4 shows the determination coefficient R$^2$, slope a, and y-intercept b obtained by calculating the regression line expressed by the least-squares method from the scatter plot of the natural logarithm (ln(η)) of the shear viscosity η (Pa·s) and the complex modulus G*(Pa), which are the measurement results of Examples 1-2, 1-8, and Comparative Example 1-3.

FIG. shows an example of a scatter plot of the measurement results using CNT dispersions after storage at 40° C. for 1 day, 7 days, and 14 days for Examples 1-2, 1-8, and Comparative Example 1-3 as examples.

For example, the determination coefficient R$^2$ obtained from the regression line for the CNT dispersion of Example 1-2 was 1.00, the slope a was 8.4, and the y-intercept b was 4.1. The determination coefficient R$^2$ obtained from the regression line for the CNT dispersion of Comparative Example 1-3 was 0.79, the slope a was 20.8, and the y-intercept b was −0.5.

The evaluation criteria in Table 4 are as follows.

[Evaluation Criteria for Determination Coefficient R$^2$]
A: 0.95 or more
B: 0.90 or more and less than 0.95
C: 0.85 or more and less than 0.90
D: Less than 0.85

[Evaluation Criteria for Slope a]
A: 7 or more and less than 14
B: 5 or more and less than 7, or 14 or more and less than 15
C: 2 or more and less than 5, or 15 or more and less than 20
D: Less than 2, or 20 or more

[Evaluation Criteria for Y-Intercept b]
A: 0 or more and less than 6
B: −3 or more and less than 0, or 6 or more and less than 8
C: −5 or more and less than −3, or 8 or more and less than 10
D: Less than −5, or 10 or more Filtration Rate The dispersibility of the CNT dispersion was evaluated based on the filtration rate.

The method for the filtration rate test involved adding 80 g of NMP to 40 g of CNT dispersion and thoroughly mixing by hand shaking. The entire mixture was placed in a 300 mL filter holder for vacuum filtration, and a scale was positioned under the receiving container in the suction filtration bell to measure the weight with respect to the time passed through a 10 μm mesh. The shorter the time required to filter the entire diluted CNT dispersion, the better the dispersibility. Further, poorly dispersed samples contained agglomerated CNTs and could not be filtered completely. If the evaluation criterion is + or higher, it is considered practical for use.

[Evaluation Criteria]
+++: Less than 30 seconds
++: 30 seconds or more and less than 100 seconds
+: 100 seconds or more
NG: Unable to filter the entire amount Acid Stability The fluidity and dispersion stability of the CNT dispersion were evaluated by acid stability. The evaluation of acid stability was performed as follows: 5 parts by mass of succinic acid (succinic acid: FUJIFILM Wako Pure Chemical Corporation, purity >99.5%) was added to 100 parts by mass of CNT dispersion; the initial viscosity of the CNT dispersion containing acid and the viscosity after storing the CNT dispersion containing acid at 40° C. for 7 days were measured respectively; and the change rate in viscosity after storage at 40° C. for 7 days compared to the initial viscosity was calculated and evaluated.

The change rate in viscosity is expressed as a percentage by dividing the viscosity value after storage at 40° C. for 7 days by the initial viscosity value. The viscosity of the CNT dispersion was measured using a B-type viscometer (BL, manufactured by Tokyo Keiki Inc.) at a temperature of 25° C., and after thoroughly stirring with a spatula, the measurement was immediately taken with the B-type viscometer rotor rotating at 60 rpm. A smaller change rate is desirable, and if the evaluation criterion is + or higher, it is considered practical for use.

[Evaluation Criteria]
+++: Less than 200%
++: 200% or more and less than 500%
+: 500% or more and less than 1000%
NG: 1000% or more (gelation has occurred)

TABLE 3

Table 3

| Example Comparative Example | Resin composition | Storage temperature (° C.) | Duration (day) | $\eta_i, G^*_i$ | H (Pa·s) | $G^*$ (Pa) |
|---|---|---|---|---|---|---|
| Example 1-2 | CNT dispersion 2 | 40 | 1 | $\eta_1, G^*_1$ | 1.4 | 6.7 |
|  |  |  | 7 | $\eta_7, G^*_7$ | 2.6 | 12.3 |
|  |  |  | 14 | $\eta_{14}, G^*_{14}$ | 3.1 | 13.6 |
| Example 1-8 | Resin composition 8 | 40 | 1 | $\eta_1, G^*_1$ | 1.4 | 7.0 |
|  |  |  | 7 | $\eta_7, G^*_7$ | 2.4 | 11.4 |
|  |  |  | 14 | $\eta_{14}, G^*_{14}$ | 2.8 | 12.6 |
| Comparative Example 1-3 | Comparative CNT dispersion 3 | 40 | 1 | $\eta_1, G^*_1$ | 1.4 | 7.3 |
|  |  |  | 7 | $\eta_7, G^*_7$ | 9.3 | 33.0 |
|  |  |  | 14 | $\eta_{14}, G^*_{14}$ | 11.2 | 61.4 |

TABLE 2

Table 2

| Example Comparative Example | CNT dispersion | CNT Type | CNT Amount Part | Dispersant Type | Dispersant Amount Part | Additive Type | Additive Amount Part | NMP Amount Part | Bead mill Retention Minute | Filterability | Acid stability |
|---|---|---|---|---|---|---|---|---|---|---|---|
| Example 1-1 | CNT dispersion 1 | CNT1 | 5 | HNBR1 | 1 | NaOH | 0.03 | 93.97 | 5 | ++ | ++ |
| Example 1-2 | CNT dispersion 2 | CNT2 | 5 | HNBR1 | 1 | NaOH | 0.03 | 93.97 | 5 | +++ | +++ |
| Example 1-3 | CNT dispersion 3 | CNT3 | 5 | HNBR1 | 1 | NaOH | 0.03 | 93.97 | 5 | +++ | +++ |
| Example 1-4 | CNT dispersion 4 | CNT4 | 5 | HNBR1 | 1 | NaOH | 0.03 | 93.97 | 5 | +++ | +++ |
| Example 1-5 | CNT dispersion 5 | CNT5 | 5 | HNBR1 | 1 | NaOH | 0.03 | 93.97 | 5 | ++ | + |
| Example 1-6 | CNT dispersion 6 | CNT6 | 5 | HNBR1 | 1 | NaOH | 0.03 | 93.97 | 5 | ++ | ++ |
| Example 1-7 | CNT dispersion 7 | CNT7 | 5 | HNBR1 | 1 | NaOH | 0.03 | 93.97 | 5 | +++ | +++ |
| Example 1-8 | CNT dispersion 8 | CNT8 | 5 | HNBR1 | 1 | NaOH | 0.03 | 93.97 | 5 | +++ | +++ |
| Example 1-9 | CNT dispersion 9 | CNT9 | 5 | HNBR1 | 1 | NaOH | 0.03 | 93.97 | 5 | ++ | ++ |
| Example 1-10 | CNT dispersion 10 | CNT1 | 5 | HNBR2 | 1 | NaOH | 0.03 | 93.97 | 5 | ++ | ++ |
| Example 1-11 | CNT dispersion 11 | CNT1 | 5 | PVA | 1 | 2-Aminoethanol | 0.03 | 93.97 | 5 | ++ | ++ |
| Example 1-12 | CNT dispersion 12 | CNT1 | 5 | PVP | 1 | 2-Aminoethanol | 0.03 | 93.97 | 5 | ++ | ++ |
| Example 1-13 | CNT dispersion 13 | CNT1 | 5 | HNBR1 | 1 | NaOH | 0.01 | 93.99 | 5 | ++ | +++ |
| Example 1-14 | CNT dispersion 14 | CNT1 | 5 | HNBR1 | 1 | — | 0.00 | 94.00 | 5 | + | +++ |
| Example 1-15 | CNT dispersion 15 | CNTI | 5 | HNBR1 | 1 | NaOH | 0.03 | 93.97 | 10 | +++ | +++ |
| Comparative Example 1-1 | Comparative CNT dispersion 1 | Comparative CNT 1 | 5 | HNBR1 | 1 | NaOH | 0.03 | 93.97 | 5 | +++ | +++ |
| Comparative Example 1-2 | Comparative CNT dispersion 2 | Comparative CNT 2 | 5 | HNBR1 | 1 | NaOH | 0.03 | 93.97 | 5 | ++ | ++ |
| Comparative Example 1-3 | Comparative CNT dispersion 3 | Comparative CNT 3 | 5 | HNBR1 | 1 | NaOH | 0.03 | 93.97 | 5 | NG | NG |
| Comparative Example 1-4 | Comparative CNT dispersion 4 | Comparative CNT 4 | 5 | HNBR1 | 1 | NaOH | 0.03 | 93.97 | 5 | + | + |
| Comparative Example 1-5 | Comparative CNT dispersion 5 | Comparative CNT 5 | 5 | HNBR1 | 1 | NaOH | 0.03 | 93.97 | 5 | ++ | + |

TABLE 4-1

| Example / Comparative Example | CNT dispersion | | $\eta_1, G^*_1$ / $\eta_7, G^*_7$ / $\eta_{14}, G^*_{14}$ | |
|---|---|---|---|---|
| Example 1-1 | CNT dispersion 1 | a | 15.6 | C |
| | | b | 5.8 | A |
| | | $R^2$ | 0.95 | A |
| Example 1-2 | CNT dispersion 2 | a | 8.4 | A |
| | | b | 4.1 | A |
| | | $R^2$ | 1.00 | A |
| Example 1-3 | CNT dispersion 3 | a | 3.8 | C |
| | | b | 6.0 | B |
| | | $R^2$ | 0.98 | A |
| Example 1-4 | CNT dispersion 4 | a | 8.2 | A |
| | | b | 4.0 | A |
| | | $R^2$ | 1.00 | A |
| Example 1-5 | CNT dispersion 5 | a | 16.0 | C |
| | | b | 6.5 | B |
| | | $R^2$ | 0.95 | A |
| Example 1-6 | CNT dispersion 6 | a | 8.0 | A |
| | | b | 4.4 | A |
| | | $R^2$ | 1.00 | A |
| Example 1-7 | CNT dispersion 7 | a | 4.3 | C |
| | | b | 5.9 | A |
| | | $R^2$ | 0.98 | A |

TABLE 4-2

| Example / Comparative Example | CNT dispersion | | $\eta_1, G^*_1$ / $\eta_7, G^*_7$ / $\eta_{14}, G^*_{14}$ | |
|---|---|---|---|---|
| Example 1-8 | CNT dispersion 8 | a | 8.2 | A |
| | | b | 4.0 | A |
| | | $R^2$ | 1.00 | A |
| Example 1-9 | CNT dispersion 9 | a | 11.1 | A |
| | | b | 6.0 | B |
| | | $R^2$ | 0.99 | A |
| Example 1-10 | CNT dispersion 10 | a | 8.3 | A |
| | | b | 4.1 | A |
| | | $R^2$ | 1.00 | A |
| Example 1-11 | CNT dispersion 11 | a | 9.1 | A |
| | | b | 3.7 | A |
| | | $R^2$ | 1.00 | A |
| Example 1-12 | CNT dispersion 12 | a | 9.6 | A |
| | | b | 3.4 | A |
| | | $R^2$ | 1.00 | A |
| Example 1-13 | CNT dispersion 13 | a | 16.5 | C |
| | | b | 5.2 | A |
| | | $R^2$ | 0.95 | A |
| Example 1-14 | CNT dispersion 14 | a | 19.8 | C |
| | | b | 2.6 | A |
| | | $R^2$ | 0.95 | A |
| Example 1-15 | CNT dispersion 15 | a | 3.8 | C |
| | | b | 6.0 | B |
| | | $R^2$ | 0.99 | A |

TABLE 4-3

| Example / Comparative Example | CNT dispersion | | $\eta_1, G^*_1$ / $\eta_7, G^*_7$ / $\eta_{14}, G^*_{14}$ | |
|---|---|---|---|---|
| Comparative Example 1-1 | Comparative CNT dispersion 1 | a | 1.4 | D |
| | | b | 3.3 | A |
| | | $R^2$ | 0.99 | A |
| Comparative Example 1-2 | Comparative CNT dispersion 2 | a | 1.6 | D |
| | | b | 3.7 | A |
| | | $R^2$ | 0.98 | A |
| Comparative Example 1-3 | Comparative CNT dispersion 3 | a | 20.8 | D |
| | | b | −0.5 | B |
| | | $R^2$ | 0.79 | D |
| Comparative Example 1-4 | Comparative CNT dispersion 4 | a | 17.9 | C |
| | | b | 3.3 | A |
| | | $R^2$ | 0.75 | D |
| Comparative Example 1-5 | Comparative CNT dispersion 5 | a | 19.3 | C |
| | | b | 1.4 | A |
| | | $R^2$ | 0.77 | D |

Preparation of Carbon Nanotube Resin Composition, Positive Electrode Mixture Slurry, and Positive Electrode Examples 2-1 to 2-19, Comparative Examples 2-1 to 2-5

According to the combinations and composition ratios shown in Table 5, carbon nanotube resin compositions, positive electrode mixture slurries, and positive electrodes were prepared as follows. CNT dispersion was placed in a stainless steel jacketed tank, and the temperature of the jacketed tank was heated to 60° C. so that the liquid temperature measured by a thermocouple thermometer became 60° C., and while stirring with a disper, the binder resin was added at a rate of 0.8 parts by mass per minute until the total amount was added. The temperature was adjusted to maintain the liquid temperature at 60° C. as measured by the thermocouple thermometer, and stirring was performed for 3 hours using the disper to completely dissolve the binder resin, thereby obtaining a carbon nanotube resin composition.

The CNT resin composition and the positive electrode active material were added to a 150 cm³ plastic container, and stirred for 5 minutes at 2,000 rpm using a rotation/revolution mixer (Awatori Rentaro, ARE-310, manufactured by Thinky Corporation) to obtain a positive electrode mixture slurry. The non-volatile content of the positive electrode mixture slurry was set to 78% by mass.

The positive electrode mixture slurry was coated on a 20 μm thick aluminum foil using an applicator, then heated and dried at 120±5° C. for 25 minutes in an electric oven to prepare an electrode film. Subsequently, the electrode film was subjected to rolling treatment using a roll press (manufactured by Thank-metal, 3t hydraulic roll press) to obtain positive electrodes (positive electrodes 1 to 18, comparative positive electrodes 1 to 4). It is noted that the basis weight per unit area of the composite layer was 20 mg/cm², and the density of the composite layer after rolling treatment was 3.2 g/cm³.

In the examples and comparative examples, the following positive electrode active materials were used.

NMC1: CELLSEED NMC ($LiNi_{0.6}Co_{0.2}Mn_{0.2}O_2$, manufactured by Nippon Chemical Industrial Co., Ltd.)

NMC2: S800 ($LiNi_{0.8}Mn_{0.1}Co_{0.1}O_2$, manufactured by Kinwa)

NCA: NAT-7050 ($LiNi_{0.8}Co_{0.15}Al_{0.05}O_2$, manufactured by BASF TODA Battery Materials)

LFP: HED (trademark) LFP-400 (lithium iron phosphate, manufactured by BASF)

Evaluation of Positive Electrodes

Conductivity of Positive Electrodes

The surface resistivity (Ω/□) of the composite layer of the obtained positive electrode was measured using Loresta GP, MCP-T610 manufactured by Mitsubishi Chemical Analytech. After measurement, the thickness of the composite layer was multiplied to obtain the volume resistivity (Ω·cm) of the positive electrode. The thickness of the composite layer was determined by measuring three points in the electrode using a film thickness meter (DIGIMICRO MH-15M, manufactured by NIKON), taking the average value, and subtracting the thickness of the aluminum foil to obtain the volume resistivity (Ω·cm) of the positive electrode. A lower volume resistivity is desirable.

[Evaluation Criteria]
++++: Less than 10 Ω·cm
+++: 10 Ω·cm or more and less than 20 Ω·cm
++: 20 Ω·cm or more and less than 30 Ω·cm
+: 30 Ω·cm or more Adhesion of Positive Electrode The obtained positive electrode was cut into two rectangular pieces of 90 mm×20 mm with the coating direction as the long axis. The peel strength was measured using a tabletop tensile tester (Strograph E3, manufactured by Toyo Seiki Co., Ltd.) and evaluated by a 180-degree peel test method. Specifically, a double-sided tape (No. 5000NS, manufactured by Nitoms Inc.) of 100 mm×30 mm size was attached to a stainless steel plate, and the composite material layer side of the prepared positive electrode was adhered to the other side of the double-sided tape to create a test sample. Next, the test sample was vertically fixed so that the short sides of the rectangles were up and down and peeled off at a certain speed (50 mm/min) while pulling the end of the aluminum foil upward from below, and the average value of the stress at this time was used as the peel strength. A higher peel strength is desirable.

[Evaluation Criteria]
++++: 0.8 N/cm or more
+++: 0.5 N/cm or more and less than 0.8 N/cm
++: 0.3 N/cm or more and less than 0.5 N/cm
+: Less than 0.3 N/cm

TABLE 5

Table 5

| Example/Comparative Example | Positive electrode | Resin composition | Positive electrode active material Type | Solid content ratio (Part) | CNT Solid content ratio (Part) | Binder resin Type | Solid content ratio (Part) | Conductivity | Adhesion |
|---|---|---|---|---|---|---|---|---|---|
| Example 2-1 | Positive electrode 1 | Resin composition 1 | NMC1 | 96.985 | 2.5 | PVDF | 2.575 | ++++ | ++++ |
| Example 2-2 | Positive electrode 2 | Resin composition 2 | NMC1 | 96.985 | 2.5 | PVDF | 2.575 | ++++ | ++++ |
| Example 2-3 | Positive electrode 3 | Resin composition 3 | NMC1 | 96.985 | 2.5 | PVDF | 2.575 | +++ | +++ |
| Example 2-4 | Positive electrode 4 | Resin composition 4 | NMC1 | 96.985 | 2.5 | PVDF | 2.575 | +++ | ++++ |
| Example 2-5 | Positive electrode 5 | Resin composition 5 | NMC1 | 96.985 | 2.5 | PVDF | 2.575 | ++++ | ++++ |
| Example 2-6 | Positive electrode 6 | Resin composition 6 | NMC1 | 96.985 | 2.5 | PVDF | 2.575 | +++ | +++ |
| Example 2-7 | Positive electrode 7 | Resin composition 7 | NMC1 | 96.985 | 2.5 | PVDF | 2.575 | ++ | ++ |
| Example 2-8 | Positive electrode 8 | Resin composition 8 | NMC1 | 96.985 | 2.5 | PVDF | 2.575 | +++ | +++ |
| Example 2-9 | Positive electrode 9 | Resin composition 9 | NMC1 | 96.985 | 2.5 | PVDF | 2.575 | ++ | ++ |
| Example 2-10 | Positive electrode 10 | Resin composition 10 | NMC1 | 96.985 | 2.5 | PVDF | 2.575 | +++ | ++ |
| Example 2-11 | Positive electrode 11 | Resin composition 11 | NMC1 | 96.985 | 2.5 | PVDF | 2.575 | ++ | +++ |
| Example 2-12 | Positive electrode 12 | Resin composition 12 | NMC1 | 96.985 | 2.5 | PVDF | 2.575 | ++ | +++ |
| Example 2-13 | Positive electrode 13 | Resin composition 13 | NMC1 | 96.995 | 2.5 | PVDF | 2.575 | +++ | +++ |
| Example 2-14 | Positive electrode 14 | Resin composition 14 | NMC1 | 97.000 | 2.5 | PVDF | 2.575 | +++ | +++ |
| Example 2-15 | Positive electrode 15 | Resin composition 15 | NMC1 | 96.985 | 2.5 | PVDF | 2.575 | ++ | +++ |
| Example 2-16 | Positive electrode 16 | Resin composition 1 | NMC1 | 96.985 | 2.5 | PTFE | 2.575 | +++ | +++ |
| Example 2-17 | Positive electrode 17 | Resin composition 1 | NMC2 | 96.985 | 2.5 | PVDF | 2.575 | +++ | ++++ |
| Example 2-18 | Positive electrode 18 | Resin composition 1 | NCA | 96.985 | 2.5 | PVDF | 2.575 | +++ | ++++ |
| Example 2-19 | Positive electrode 19 | Resin composition 1 | LFP | 96.985 | 2.5 | PVDF | 2.575 | ++ | ++++ |
| Comparative Example 2-1 | Comparative positive electrode 1 | Comparative resin composition 1 | NMC1 | 96.985 | 2.5 | PVDF | 2.575 | + | + |
| Comparative Example 2-2 | Comparative positive electrode 2 | Comparative resin composition 2 | NMC1 | 96.985 | 2.5 | PVDF | 2.575 | + | + |

TABLE 5-continued

Table 5

| Example/Comparative Example | Positive electrode | Resin composition | Positive electrode active material Type | Positive electrode active material Solid content ratio (Part) | CNT Solid content ratio (Part) | Binder resin Type | Binder resin Solid content ratio (Part) | Conductivity | Adhesion |
|---|---|---|---|---|---|---|---|---|---|
| Comparative Example 2-3 | Comparative positive electrode 3 | Comparative resin composition 3 | NMC1 | 96.985 | 2.5 | PVDF | 2.575 | ++++ | +++ |
| Comparative Example 2-4 | Comparative positive electrode 4 | Comparative resin composition 4 | NMC1 | 96.985 | 2.5 | PVDF | 2.575 | + | + |
| Comparative Example 2-5 | Comparative positive electrode 5 | Comparative resin composition 5 | NMC1 | 96.985 | 2.5 | PVDF | 2.575 | + | + |

Preparation of Secondary Battery

Preparation of Standard Negative Electrode

In a plastic container with a capacity of 150 ml, 0.5 parts of acetylene black (Denka Black (registered trademark) HS-100, manufactured by Denka Co., Ltd.), 1 part of MAC500LC (carboxymethyl cellulose sodium salt Sunrose special type MAC500LC manufactured by Nippon Paper Industries Co., Ltd., a non-volatile content of 100%), and 98.4 parts of water were added, and the mixture was then stirred for 30 seconds at 2,000 rpm using a rotation/revolution mixer (Awatori Rentaro, ARE-310, manufactured by Thinky Corporation). Furthermore, 97 parts by mass of artificial graphite (CGB-20, manufactured by Nippon Graphite Industries, Co., Ltd.) were added as an active material, and the mixture was stirred for 150 seconds at 2,000 rpm using the rotation/revolution mixer (Awatori Rentaro, ARE-310, manufactured by Thinky Corporation). Subsequently, 3.1 parts of SBR (styrene-butadiene rubber, TRD2001, a non-volatile content of 48%, manufactured by JSR Corporation) were added, and the mixture was stirred for 30 seconds at 2,000 rpm using the rotation/revolution mixer (Awatori Rentaro, ARE-310, manufactured by Thinky Corporation) to obtain a standard negative electrode mixture slurry. The non-volatile content of the standard negative electrode mixture slurry was set to 50% by mass.

The above standard negative electrode mixture slurry was coated on a 20 μm thick copper foil, which serves as the current collector, using an applicator, and the coated foil was then dried in an electric oven at 80° C.±5° C. for 25 minutes, adjusting the coating weight per unit area of the electrode to 10 mg/cm². Furthermore, a rolling process was performed using a roll press (3t hydraulic roll press, manufactured by Thank-Metal Co., Ltd.) to prepare a standard negative electrode with a composite layer density of 1.6 g/cm³.

Examples 3-1 to 3-19, Comparative Examples 3-1 to 3-5

Using the positive electrodes and standard negative electrodes described in Table 8, each was punched out to 50 mm×45 mm and 45 mm×40 mm, respectively, and the punched positive electrode and standard negative electrode, with a separator (porous polypropylene film) inserted therebetween, were placed in an aluminum laminate pouch and dried in an electric oven at 70° C. for 1 hour. Subsequently, in a glove box filled with argon gas, 2 mL of electrolyte (a non-aqueous electrolyte prepared by mixing ethylene carbonate, dimethyl carbonate, and diethyl carbonate in a volume ratio of 1:1:1 to create a mixed solvent, then adding 1 part by mass of vinylene carbonate as an additive per 100 parts by mass of mixed solvent, and dissolving $LiPF_6$ at a concentration of 1M) was injected, and the aluminum laminate bag was then sealed to prepare each secondary battery.

Evaluation of Battery

Rate Characteristics of Secondary Battery

The obtained secondary battery was put into a thermostatic chamber at 25° C. and charging and discharging measurement was performed using a charging and discharging device (SM-8, manufactured by Hokuto Denko Corporation). After constant voltage and constant current charging (with a cut-off current of 1 mA (0.02 C)) was performed at a charging current of 10 mA (0.2 C) and an end-of-charge voltage of 4.3 V, constant current discharging was performed at a discharging current of 10 mA (0.2 C) and an end-of-discharge voltage of 3 V. After repeating this operation three times, constant voltage and constant current charging (with a cut-off current of 1 mA (0.02 C)) was performed with a charging current of 10 mA (0.2 C) and an end-of-charge voltage of 4.3 V, then, constant current discharging was performed at discharging currents of 0.2 C and 3 C until reaching the end-of-discharge voltage of 3.0 V, and the respective discharge capacities were determined. The rate characteristics may be expressed as the ratio of the 0.2 C discharge capacity to the 3 C discharge capacity, as shown in the following Expression 1.

Rate characteristics=(3C discharge capacity/3rd 0.2C discharge capacity)×100%  Expression 1

Higher rate characteristics are desirable.
[Evaluation Criteria]
++++: 80% or more
+++: 60% or more and less than 80%
++: 40% or more and less than 60%
+: Less than 40%

Cycle Characteristics of Secondary Battery

The obtained secondary battery was put into a thermostatic chamber at 25° C. and charging and discharging measurement was performed using a charging and discharging device (SM-8, manufactured by Hokuto Denko Corporation). After constant voltage and constant current charging (with a cut-off current 2.5 mA (0.05 C)) was performed at a charging current of 25 mA (0.5 C) and an end-of-charge voltage of 4.3V, and constant current discharging was performed at a discharging current of 25 mA (0.5 C) and an end-of-discharge voltage of 3V. This operation was repeated 200 times. The cycle characteristics may be expressed by the ratio of the 0.5 C discharge capacity at the 3rd cycle to the 0.5 C discharge capacity at the 200th cycle at 25° C., as shown in the following Expression 2.

Cycle characteristics=(0.5$C$ discharge capacity at 200$th$ cycle/0.5$C$ discharge capacity at 3$rd$ cycle)×100(%)  Expression 2

Higher cycle characteristics are desirable.
[Evaluation Criteria]
++++: 85% or more
1+++: 80% or more and less than 85%
++: 50% or more and less than 80%
+: Less than 50% present invention, and the CNT dispersions using these exhibit excellent filterability and acid stability, and the battery performance of secondary batteries using these is improved. CNT1 in Example 1 and CNT5 in Example 5 are reference examples.

Although the present invention has been described above with reference to the embodiment, the present invention is not limited to the above. The configuration and details of the present invention may be modified in various ways within the scope of the invention as understood by those skilled in the art.

The disclosure of this application is related to the subject matter described in Japanese Patent Application No. 2023-105931 filed on Jun. 28, 2023, and Japanese Patent Application No. 2024-089114 filed on May 31, 2024, the entire contents of which are incorporated herein by reference.

The invention claimed is:

1. Carbon nanotubes having a bulk density X of 0.095 g/cm$^3$ or more and 0.125 g/cm$^3$ or less, a Zr content of 5 ppm or more and 500 ppm or less, and a maximum solvent

TABLE 6

| Example Comparative Example | Battery | Positive electrode | Rate characteristic | Cycle characteristic |
|---|---|---|---|---|
| Example 3-1 | Battery 1 | Positive electrode 1 | ++++ | ++++ |
| Example 3-2 | Battery 2 | Positive electrode 2 | ++++ | ++++ |
| Example 3-3 | Battery 3 | Positive electrode 3 | +++ | +++ |
| Example 3-4 | Battery 4 | Positive electrode 4 | +++ | +++ |
| Example 3-5 | Battery 5 | Positive electrode 5 | ++++ | ++++ |
| Example 3-6 | Battery 6 | Positive electrode 6 | +++ | +++ |
| Example 3-7 | Battery 7 | Positive electrode 7 | ++ | ++ |
| Example 3-8 | Battery 8 | Positive electrode 8 | +++ | +++ |
| Example 3-9 | Battery 9 | Positive electrode 9 | ++ | ++ |
| Example 3-10 | Battery 10 | Positive electrode 10 | +++ | +++ |
| Example 3-11 | Battery 11 | Positive electrode 11 | ++ | +++ |
| Example 3-12 | Battery 12 | Positive electrode 12 | ++ | +++ |
| Example 3-13 | Battery 13 | Positive electrode 13 | +++ | +++ |
| Example 3-14 | Battery 14 | Positive electrode 14 | +++ | +++ |
| Example 3-15 | Battery 15 | Positive electrode 15 | ++ | +++ |
| Example 3-16 | Battery 16 | Positive electrode 16 | +++ | +++ |
| Example 3-17 | Battery 17 | Positive electrode 17 | +++ | +++ |
| Example 3-18 | Battery 18 | Positive electrode 18 | +++ | +++ |
| Example 3-19 | Battery 19 | Positive electrode 19 | +++ | +++ |
| Comparative Example 3-1 | Comparative battery 1 | Comparative positive electrode 1 | + | + |
| Comparative Example 3-2 | Comparative battery 2 | Comparative positive electrode 2 | + | + |
| Comparative Example 3-3 | Comparative battery 3 | Comparative positive electrode 3 | ++ | +++ |
| Comparative Example 3-4 | Comparative battery 4 | Comparative positive electrode 4 | + | + |
| Comparative Example 3-5 | Comparative battery 5 | Comparative positive electrode 5 | + | + |

As shown in Tables 2 to 6, the carbon nanotubes that satisfy the range of the present invention exhibit excellent conductivity and dispersibility, and the carbon nanotube dispersion including the carbon nanotubes is confirmed to have excellent fluidity and high dispersion stability and storage stability. Further, the mixture slurry for secondary battery electrodes exhibits excellent dispersibility of CNTs in a state including active material, and the electrode film using this has high conductivity and adhesion. Furthermore, the obtained secondary battery excelled in rate characteristics and cycle characteristics. As a result, it was confirmed to be a secondary battery with high output, high capacity, and long life.

CNT2 to CNT4 in Examples 2 to 4 and CNT6 to CNT9 in Examples 6 to 9 respectively satisfy the range of the absorption capacity Y of carbon nanotubes defined by formula (5) below of 8.0 or more, $Y=W/V$  formula (5)

in formula (5), V is a mass (g) of carbon nanotubes, and W is a maximum mass (g) of N-methyl-2-pyrrolidone absorbed by carbon nanotubes when N-methyl-2-pyrrolidone is added dropwise to V (g) of carbon nanotubes in a 25° C. environment.

2. The carbon nanotubes according to claim 1, wherein a bulk density X (g/cm$^3$) and a maximum solvent absorption capacity Y of carbon nanotubes satisfy all of formulae (1) to (4) below, $Y \leq -200X+37$  formula (1)

$Y \geq 200X-17$  formula (2)

$$Y \geq -200X+27 \qquad \text{formula (3)}$$

$$Y \leq 200X+7 \qquad \text{formula (4).}$$

3. The carbon nanotubes according to claim 1, wherein an average fiber length is 0.2 μm or more and 1.1 μm or less.

4. The carbon nanotubes according to claim 1, wherein an average fiber length is 0.2 μm or more and 1.0 μm or less, and a Zr content is 15 ppm or more and 200 ppm or less.

5. A carbon nanotube dispersion, containing carbon nanotubes according to claim 1, a dispersant, and a non-aqueous dispersion medium.

6. The carbon nanotube dispersion according to claim 5, wherein a determination coefficient $R^2$ of a regression line represented by formula (I) below is 0.85 or more, a slope a is 2≤a<20, and a y-intercept b is −5≤b<10, $$y=ax+b \qquad \text{formula (I)}$$

formula (I) is a regression line obtained by a least-squares method from a scatter plot with x plotted on a horizontal axis and y plotted on a vertical axis, measured using carbon nanotube dispersions with storage temperatures and durations of 40° C. for 1 day, 40° C. for 7 days, and 40° C. for 14 days, respectively, when i is a number of days elapsed during storage, $\eta_i$(Pa·s) is a shear viscosity at 25° C. and a shear rate of 1.0 s$^{-1}$ of a resin composition for secondary battery when a storage temperature is 40° C., and $G^*_i$ (Pa) is a complex modulus at 25° C. and a frequency of 1 Hz obtained by dynamic viscoelastic measurement, x is a natural logarithm (ln(η)) of the shear viscosity $\eta_i$(Pa·s) at 25° C. and a shear rate of 1.0 s$^{-1}$, y is the complex modulus $G^*_i$ (Pa) at 25° C. and a frequency of 1 Hz, and i is 1, 7, and 14, with a manufacturing date of carbon nanotube dispersion being day 0.

7. A carbon nanotube resin composition, containing a carbon nanotube dispersion according to claim 5 and a binder resin.

8. A mixture slurry, containing a carbon nanotube dispersion according to claim 5, a binder resin, and an active material.

9. An electrode film, being formed from a mixture slurry according to claim 8.

10. A secondary battery, containing a positive electrode and a negative electrode, wherein at least one of the positive electrode and the negative electrode contains an electrode film according to claim 9.

11. A method for manufacturing carbon nanotubes, comprising a process of dry grinding carbon nanotubes using a milling device including grinding media made of metal or ceramics, wherein the dry grinding is pass-type grinding or circulation-type grinding, and carbon nanotubes after the dry grinding have a bulk density X of 0.095 g/cm$^3$ or more and 0.125 g/cm$^3$ or less, a Zr content of 5 ppm or more and 500 ppm or less, and a maximum solvent absorption capacity Y of carbon nanotubes defined by formula (5) below of 8.0 or more, $$Y=W/V \qquad \text{formula (5)}$$

in formula (5), V is a mass (g) of carbon nanotubes, and W is a maximum mass (g) of N-methyl-2-pyrrolidone absorbed by carbon nanotubes when N-methyl-2-pyrrolidone is added dropwise to V (g) of carbon nanotubes in a 25° C. environment.

12. The method for manufacturing carbon nanotubes according to claim 11, wherein a change rate between a bulk density X after dry grinding and a bulk density X' before dry grinding is −60% or more and 1000% or less, bulk density change rate (%)=(X/X'−1)×100.

13. The method for manufacturing carbon nanotubes according to claim 11, wherein a change rate between a powder resistance value Re after dry grinding and a powder resistance value Re' before dry grinding is 1% or more and 20% or less, powder resistance value change rate (%)=(Re/Re'−1)×100.

14. The method for manufacturing carbon nanotubes according to claim 11, wherein the grinding media are zirconia beads, and a bead diameter of the zirconia beads is more than 5 mm and less than 10 mm.

15. The method for manufacturing carbon nanotubes according to claim 11, wherein carbon nanotubes after the dry grinding have an average fiber length of 0.2 μm or more and 1.1 μm or less.

16. The method for manufacturing carbon nanotubes according to claim 11, wherein carbon nanotubes after the dry grinding have an average fiber length of 0.2 μm or more and 1.0 μm or less, and a Zr content of 15 ppm or more and 200 ppm or less.

17. A method for manufacturing a carbon nanotube dispersion, comprising a process of mixing and dispersing carbon nanotubes according to claim 11, a dispersant, and a non-aqueous dispersion medium.

\* \* \* \* \*